United States Patent
Swales

(10) Patent No.: US 11,117,460 B2
(45) Date of Patent: Sep. 14, 2021

(54) ELECTRO-MECHANICAL DRIVE UNIT AND A POWERTRAIN

(71) Applicant: GM Global Technology Operations LLC, Detroit, MI (US)

(72) Inventor: Shawn H. Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 149 days.

(21) Appl. No.: 16/283,090

(22) Filed: Feb. 22, 2019

(65) Prior Publication Data
US 2020/0269674 A1    Aug. 27, 2020

(51) Int. Cl.
| | |
|---|---|
| B60K 6/44 | (2007.10) |
| F16H 3/66 | (2006.01) |
| B60K 6/38 | (2007.10) |
| B60K 6/365 | (2007.10) |
| F16H 3/72 | (2006.01) |

(52) U.S. Cl.
CPC ........... B60K 6/44 (2013.01); B60K 6/365 (2013.01); B60K 6/38 (2013.01); F16H 3/66 (2013.01); F16H 3/727 (2013.01); B60Y 2200/92 (2013.01)

(58) Field of Classification Search
CPC .. B60K 6/365; B60K 6/38; B60K 6/44; F16H 3/66; F16H 3/727; F16H 2200/2005; F16H 2200/2007; F16H 2200/201; F16H 2200/2023; F16H 2200/2033; F16H 2200/2035; F16H 2200/2038; B60Y 2200/92
See application file for complete search history.

(56) References Cited

U.S. PATENT DOCUMENTS

| | | | |
|---|---|---|---|
| 5,558,595 A | 9/1996 | Schmidt et al. | |
| 7,278,941 B2 | 10/2007 | Holmes et al. | |
| 7,341,534 B2 | 3/2008 | Schmidt | |
| 8,840,500 B2 | 9/2014 | Tamai et al. | |
| 2007/0049443 A1* | 3/2007 | Schmidt | B60K 6/105 475/5 |
| 2015/0031488 A1* | 1/2015 | Okuda | B60K 6/547 475/5 |
| 2019/0275877 A1* | 9/2019 | Rowa | B60W 10/04 |

* cited by examiner

*Primary Examiner* — Charles A Fox
*Assistant Examiner* — Lori Wu
(74) *Attorney, Agent, or Firm* — Quinn IP Law

(57) ABSTRACT

A powertrain and an electro-mechanical drive unit includes a first electric machine and a second electric machine each operable as a motor to produce motor torque or as a generator to produce energy. The first and second electric machines are in electrical communication with each other. The electro-mechanical drive unit further includes a hydrodynamic coupling apparatus configured to transfer engine torque. The hydrodynamic coupling apparatus includes an impeller and a turbine fluidly connected to the impeller. The hydrodynamic coupling apparatus is coupled to one of the first and second electric machines to combine the engine torque transferred via the hydrodynamic coupling apparatus with the motor torque produced by the first and/or second electric machines when the first and/or second electric machines operate as the motor.

59 Claims, 5 Drawing Sheets

ELECTRO-MECHANICAL DRIVE UNIT AND A POWERTRAIN

Hybrid powertrains for vehicles utilize different power sources under different vehicle operating conditions. An electro-mechanical hybrid powertrain typically has an internal combustion engine, such as a diesel or gasoline engine, and one or more motor/generators. Different operating modes, such as an engine-only operating mode, an electric-only operating mode, and a hybrid operating mode are established by engaging brakes and/or clutches in different combinations and controlling the engine and motor/generators. The various operating modes are advantageous, as they may be used to improve fuel economy. However, the components of the hybrid powertrain required for acceleration of the vehicle, such as the motor/generators, may increase overall vehicle cost and packaging space requirements.

SUMMARY

The present disclosure provides an electro-mechanical drive unit that includes a first electric machine operable as a motor to produce motor torque or as a generator to produce energy. The electro-mechanical drive unit also includes a second electric machine operable as a motor to produce motor torque or as a generator to produce energy. The first and second electric machines are in electrical communication with each other. The electro-mechanical drive unit further includes a hydrodynamic coupling apparatus configured to transfer engine torque. The hydrodynamic coupling apparatus includes an impeller and a turbine fluidly connected to the impeller. The hydrodynamic coupling apparatus is coupled to one of the first and second electric machines to combine the engine torque transferred via the hydrodynamic coupling apparatus with the motor torque produced by the first and/or second electric machines when the first and/or second electric machines operate as the motor.

The present disclosure also provides a powertrain that includes an engine configured to produce an engine torque. The powertrain also includes an input member connected to the engine to receive the engine torque from the engine. The input member is rotatable to transfer the engine torque. The powertrain further includes an output member coupled to the input member. The output member is rotatable to transfer the engine torque. The powertrain also includes a first electric machine operable as a motor to produce motor torque that is transferred to the output member or as a generator to produce energy. Additionally, the powertrain includes a second electric machine operable as a motor to produce motor torque that is transferred to the output member or as a generator to produce energy. The first and second electric machines are in electrical communication with each other. The powertrain further includes a hydrodynamic coupling apparatus that includes an impeller and a turbine fluidly connected to the impeller. The input member is coupleable to the impeller to transfer the engine torque from the input member to the impeller such that the hydrodynamic coupling apparatus transfers the engine torque to the output member. The hydrodynamic coupling apparatus is coupled to one of the first and second electric machines to combine the engine torque transferred via the hydrodynamic coupling apparatus with the motor torque produced by the first and/or second electric machines when the first and/or second electric machines operate as the motor.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
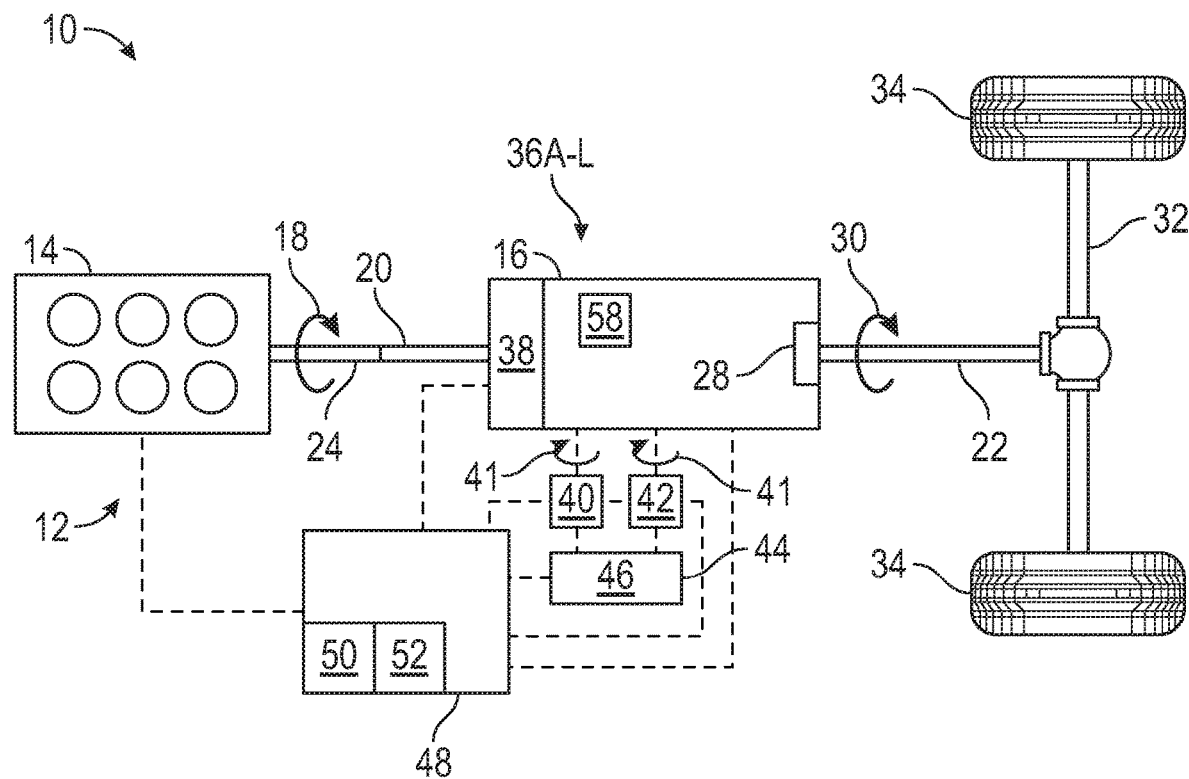
FIG. 1 is a schematic illustration of a vehicle including an electro-mechanical drive unit.

Referring to the Figures, wherein like numerals indicate like or corresponding parts throughout the several views, a vehicle 10 is shown in FIG. 1. Generally, a powertrain 12 may be utilized to produce torque to propel the vehicle 10. Therefore, the vehicle 10 may include the powertrain 12. The vehicle 10 that may utilize the powertrain 12 may be an automotive vehicle 10, such as, a car, a truck, a motorcycle, etc. It is to be appreciated that the vehicle 10 may alternatively be a non-automotive vehicle 10, such as, a farm vehicle 10, a marine vehicle 10, an aviation vehicle 10, etc. Furthermore, the vehicle 10 may be a hybrid vehicle 10 or any other suitable moveable platform utilizing the powertrain 12 disclosed herein.

Continuing with FIG. 1, the vehicle 10 may include a prime mover, such as an engine 14 and a transmission 16 coupled to the engine 14. Generally, the engine 14 is configured to produce an engine torque 18. The transmission 16 is coupled to the engine 14 to receive the engine torque 18 outputted from the engine 14. The engine 14 may be an internal combustion engine 14, such as a diesel or gasoline engine, or any other suitable type of engine.

An input member 20 is connected to the engine 14 to receive the engine torque 18 from the engine 14, and the input member 20 is rotatable to transfer the engine torque

18. An output member 22 is coupled to the input member 20, and the output member 22 is rotatable to transfer the engine torque 18. Generally, the output member 22 is indirectly coupled to the input member 20. Therefore, various components, mechanisms, devices, structure, etc., may be disposed between the output member 22 and the input member 20 to couple these members 20, 22 together (which may couple these members 20, 22 together hydraulically, electronically, mechanically, etc., and combinations thereof). The engine 14 may include an output shaft 24 (or crankshaft), and the input member 20 may be coupled to the output shaft 24.

In certain configurations, the transmission 16 may include the input member 20 and the output member 22. The output shaft 24 of the engine 14 rotates at an engine speed, and the engine torque 18 from rotation of the output shaft 24 is transferred to the input member 20 of the transmission 16, which causes the input member 20 to rotate. The powertrain 12 of the vehicle 10 may include one or more electric traction motors in a hybrid configuration to provide additional sources of input torque, which is discussed further below.

Again continuing with FIG. 1, the transmission 16 may include a final drive 28 coupled to the input member 20 and the output member 22 that delivers output torque 30 to one or more drive axles 32 through the final drive 28, and ultimately to a set of wheels 34. Therefore, the engine torque 18 from the engine 14 is transferred to the transmission 16, and the transmission 16 outputs the output torque 30 to drive the wheels 34. It is to be appreciated that the final drive 28 may be driven by an endless rotatable member, and non-limiting examples of the endless rotatable member may include a belt or a chain. The set of wheels 34 may be front wheels 34 and/or rear wheels 34; and the front wheels 34 and/or the rear wheels 34 may be powered by the powertrain 12.

Referring to FIGS. 1-13, an electro-mechanical drive unit 36A-L is connectable with multiple power sources for launching and propelling the vehicle 10. The electro-mechanical drive unit 36A-L may include the transmission 16 and a hydrodynamic coupling apparatus 38 to provide an additional path for the transfer of the engine torque 18 from the engine 14 to the wheels 34. Generally, the transmission 16 may include a gearing arrangement and one or more torque transmitting devices through which the engine torque 18 is transferred from the output shaft 24 of the engine 14 to the input member 20 of the transmission 16, then to the final drive 28 and the output torque 30 transferred out to the wheels 34 to move the vehicle 10. The transmission 16 may be an electrically variable transmission (EVT), and various configurations of the EVT are discussed below in combination with the hydrodynamic coupling apparatus 38.

Continuing with FIGS. 1-13, the electro-mechanical drive unit 36A-L includes a first electric machine 40 operable as a motor to produce motor torque 41 or as a generator to produce energy. More specifically, the first electric machine 40 may be operable as the motor to produce the motor torque 41 that is transferred to the output member 22. Additionally, the electro-mechanical drive unit 36A-L includes a second electric machine 42 operable as a motor to produce motor torque 41 or as a generator to produce energy. More specifically, the second electric machine 42 may be operable as the motor to produce the motor torque 41 that is transferred to the output member 22. The first and second electric machines 40, 42 are also in electrical communication with each other. The first and second electric machines 40, 42 may assist in reducing fuel consumption and emissions of the vehicle 10.

Referring to FIG. 1, the first and second electric machines 40, 42 may be in electrical communication with an energy storage system 44 that may include one or more batteries 46. When the first and/or second electric machines 40, 42 is/are operating as a generator, in certain modes, these machines 40, 42 are in electrical communication with the energy storage system 44 to charge the batteries 46. Also, the first and/or second electric machines 40, 42 may be utilized as a generator to generate current, i.e., electricity. When the first and/or second machines 40, 42 is/are generating current/electricity, the current may drive various auxiliary devices of the vehicle 10, such as lights, a radio, one or more pumps, etc. Hence, the first and second electric machines 40, 42 may produce energy to, for example, charge the batteries 46 and/or generate current.

In other modes, the energy storage system 44 may provide energy or power to the first and/or second electric machines 40, 42 to operate as a motor. When the first and/or second electric machines 40, 42 is/are operating as a motor, the first and/or second electric machines 40, 42 may provide the motor torque 41 to the wheels 34 in certain modes, or provide the motor torque 41 to the engine 14 in other modes. For example, the first and/or second electric machines 40, 42 may be utilized as a motor to produce the torque 41 to start the engine 14 or produce the torque 41 to assist in propelling the vehicle 10.

Generally, the EVT includes one or more gear trains or sets coupled to each of the engine 14, the first electric machine 40 and the second electric machine 42. Channeling the engine torque 18 of the engine 14 and the motor torque 41 of the two electric machines 40, 42 to different members of the gear set(s) permits one or more of the power sources to assist or balance the operation of the others. Thus, the combination of the engine 14 and two electric machines 40, 42 coupled to the EVT allows speeds and the engine torque 18 of the engine 14 and the motor torque 41 of the electric machines 40, 42 to be controlled and selected independently in order to power the vehicle 10 more efficiently.

Continuing with FIG. 1, the powertrain 12 may also include a controller 48 or electronic control unit (ECU) that is in communication with the energy storage system 44, the engine 14 and the electro-mechanical drive unit 36A-L to control the distribution of the engine torque 18 from the engine 14 and the motor torque 41 of the electro-mechanical drive unit 36A-L. Instructions may be stored in a memory 50 of the controller 48 and automatically executed via a processor 52 of the controller 48 to provide the respective control functionality. The controller 48 may include all software, hardware, memory 50, algorithms, connections, sensors, etc., necessary to control, monitor, etc., for example, the engine 14, the energy storage system 44, and the electro-mechanical drive unit 36A-L.

For all of the configurations discussed herein, the hydrodynamic coupling apparatus 38 is configured to transfer the engine torque 18. Generally, the hydrodynamic coupling apparatus 38 may provide the desired multiplication of the engine torque 18 from the engine 14 to the transmission 16. Therefore, the hydrodynamic coupling apparatus 38 may provide additional torque that is outputted to the wheels 34.

Furthermore, for all of the configurations discussed herein, the hydrodynamic coupling apparatus 38 includes an impeller 54 and a turbine 56 fluidly connected to the impeller 54. The input member 20 is coupleable to the impeller 54 to transfer the engine torque 18 from the input member 20 to the impeller 54 such that the hydrodynamic coupling apparatus 38 transfers the engine torque 18 to the output member 22. The hydrodynamic coupling apparatus 38 is coupled to one of the first and/or second electric machines 40, 42 to combine the engine torque 18 transferred via the hydrodynamic coupling apparatus 38 with the motor torque 41 produced by the first and/or second electric machines 40, 42 when the first and/or second electric machines 40, 42 operate as the motor.

The impeller 54 and the turbine 56 are operable through a fluid coupling, in which fluid moves through the impeller 54, due to rotation of the impeller 54, is transferred to the turbine 56 which causes rotation of the turbine 56. Hence, the impeller 54 and the turbine 56 are each rotatable. The impeller 54 and the turbine 56 may be rotatable concurrently or independently of each other. Generally, in the vehicle application, the impeller 54 is coupled to the output shaft 24 of the engine 14 and the turbine 56 is coupled to the output member 22 of the transmission 16. Therefore, the engine torque 18 is transferred from the engine 14 through the hydrodynamic coupling apparatus 38 via the impeller 54 and the turbine 56.

The fluid is transferred from the impeller 54 to the turbine 56, and back again, in a loop during rotation of the impeller 54 and the turbine 56. The fluid may be a liquid fluid, and non-limiting examples of the liquid fluid may include transmission fluid, oil, synthetic oil, etc. The fluid may be supplied to the hydrodynamic coupling apparatus 38 via a pump 58 (see as non-limiting examples FIGS. 1 and 2) of the transmission 16. More specifically, the fluid may be supplied to the impeller 54 of the hydrodynamic coupling apparatus 38.

The hydrodynamic coupling apparatus 38 provides additional torque to the electro-mechanical drive unit 36A-L which reduces the torque requirements needed for the first and/or second electric machines 40, 42. Therefore, a cost savings may be possible because smaller sized electric machines 40, 42 may be used that has a lower peak torque capacity as compared to electric machines that needs to be sized to produce a higher peak torque capacity. Furthermore, drive quality of the vehicle 10 may be improved via the combination of the hydrodynamic coupling apparatus 38 and the first and/or second electric machines 40, 42. Simply stated, the engine torque 18 outputted via the hydrodynamic coupling apparatus 38 supplements the motor torque 41 outputted via the first and/or second electric machines 40, 42 that is delivered via the output torque 30 to the wheels 34. Hence, the hydrodynamic coupling apparatus 38 and one or more of the electric machines 40, 42 works together to provide the desired output torque 30 to drive the wheels 34 while being able to reduce the peak torque capacity required for the electric machines 40, 42.

Generally, the hydrodynamic coupling apparatus 38 is configured to transfer the engine torque 18 during a predetermined first condition. The first electric machine 40 and/or the second electric machine 42 produce the motor torque 41 during the predetermined first condition. When the predetermined first condition ends, the hydrodynamic coupling apparatus 38 no longer provides a multiplication of the engine torque 18, and the hydrodynamic coupling apparatus 38 is locked, or does not operate, such that the engine torque 18 from the engine 14 may optionally continue to produce the engine torque 18 that is outputted as the output torque 30. The first electric machine 40 and/or the second electric machine 42 produce the motor torque 41 during a predetermined second condition without the hydrodynamic coupling apparatus 38 operating. The second condition is different from the first condition.

Generally, the hydrodynamic coupling apparatus 38 assists in transferring the engine torque 18 until a certain threshold is reached, at which time the hydrodynamic coupling apparatus 38 no longer operates to transfer a multiplication of the engine torque 18 to drive the wheels 34, and the first and/or second electric machines 40, 42 take over producing the output torque 30 to drive the wheels 34 which may be optionally in combination with the engine torque 18 of the engine 14, not the hydrodynamic coupling apparatus 38, to drive the wheels 34. For example, the first condition may be a predetermined speed of the engine 14. As such, the hydrodynamic coupling apparatus 38 may be configured to transfer the engine torque 18 during the predetermined speed. The second condition may be when a predetermined speed threshold of the engine 14 is reached, in which the first electric machine 40 and/or the second electric machine 42 produce the motor torque 41 that is outputted as the output torque 30 without the hydrodynamic coupling apparatus 38 operating. Therefore, in the second condition, the engine 14 may optionally be providing the engine torque 18 with the first and/or second electric machines 40, 42. One example of when the hydrodynamic coupling apparatus 38 may operate in combination with the first and/or second electric machines 40, 42 is during acceleration of the vehicle 10. If the vehicle 10 is stopped at a light, for example, when the vehicle 10 starts accelerating, the engine torque 18 is provided via the engine 14 and the hydrodynamic coupling apparatus 38 and the motor torque 41 is provided via the first and/or second electric machines 40, 42 until the vehicle 10 reaches a certain speed threshold at which time the first and/or second electric machines 40, 42 provide the output torque 30 to propel the vehicle 10 (without torque multiplication from the hydrodynamic coupling apparatus 38), and the engine 14 may also provide the output torque 30 to propel the vehicle 10.

Therefore, for example, the hydrodynamic coupling apparatus 38 may provide the desired multiplication of the engine torque 18 from the engine 14 into the transmission 16. Once the predetermined speed threshold is reached, the hydrodynamic coupling apparatus 38 does not operate to provide the multiplication of torque to the wheels 34. As the vehicle 10 accelerates, the hydrodynamic coupling apparatus 38 transfers the engine torque 18 to the wheels 34 which combines with the motor torque 41 being provided via the first and/or second electric machines 40, 42 until the vehicle 10 reaches the predetermined speed threshold in which the first and/or second electric machines 40, 42 and/or the engine 14 (without operating the hydrodynamic coupling apparatus 38) provide the output torque 30 to the wheels 34. Combining the multiplication of the engine torque 18 of the hydrodynamic coupling apparatus 38 and the motor torque 41 of the first and/or second electric machines 40, 42 provides the desired acceleration of the vehicle 10 as compared to using the electric machines 40, 42 without the hydrodynamic coupling apparatus 38. As such, more expensive larger electric machines may be eliminated using the electro-mechanical drive unit 36A-L described herein, and thus, the electro-mechanical drive unit 36A-L provides lower cost and/or the desired acceleration qualities.

The hydrodynamic coupling apparatus 38 may be different configurations. In certain configurations, the hydrodynamic coupling apparatus 38 is further defined as a torque converter assembly. When the hydrodynamic coupling apparatus 38 is further defined as the torque converter assembly, the torque converter assembly includes the impeller 54 and the turbine 56 as discussed herein. Additionally, the torque converter assembly may further include a stator apparatus 60 (see FIGS. 2-13). The stator apparatus 60 is grounded to a casing 62 of the torque converter assembly. The torque converter assembly may provide the desired multiplication of the engine torque 18 from the engine 14 into the transmission 16 at low speeds.

For all of the configurations discussed herein, the electro-mechanical drive unit 36A-L may include a gear set 64 (see FIGS. 2-13) mechanically coupled to one of the first electric machine 40 and the second electric machine 42. Therefore, all of the configurations herein include at least one gear set 64. The gear set 64 may be different configurations, as discussed further below. For example, in certain configurations, the gear set 64 is a planetary gear set 64. The planetary gear set 64 may be different configurations, and for example, the planetary gear set 64 may include a sun gear member 66, a ring gear member 68 and a carrier member 70 that supports a plurality of pinion gears 72 that mesh with both the ring gear member 68 and the sun gear member 66. Referring to FIGS. 2-4 and 6-13, the ring gear member 68 of the planetary gear set 64 is grounded to a housing 74 of the transmission 16. Referring to FIG. 5, the ring gear member 68 of the planetary gear set 64 is not grounded to the housing 74. The planetary gear set 64 is further defined as a first planetary gear set 64 for the below discussion.

For all of the configurations discussed herein, the electro-mechanical drive unit 36A-L may include the input member 20 and the output member 22. The input member 20 and the output member 22 may be part of the transmission 16 or EVT. Generally, the input member 20 is connected to the impeller 54, and the output member 22 is coupled to the gear set 64, and in certain configurations, the first planetary gear set 64. Depending on the configuration of the electro-mechanical drive unit 36A-L discussed below, the input member 20 is connected, directly or indirectly, to the impeller 54, and the output member 22 is coupled, directly or indirectly, to the first planetary gear set 64. Furthermore, the turbine 56 is indirectly connected to the gear set 64, and in certain configurations, the first planetary gear set 64.

Additionally, the electro-mechanical drive unit 36A, 36B, 36D-L may optionally include a first torque transmitting device 78 which is operable to selectively disconnect the hydrodynamic coupling apparatus 38 from the gear set 64, and in certain configurations the first planetary gear set 64. As non-limiting examples, the first torque transmitting device 78 may include a clutch, such as a lock-up clutch, a torque converter clutch (TCC), a one-way clutch, an active clutch or any other suitable torque transmitting device. As another non-limiting example, the first torque transmitting device 78 may include a passive one-way torque transmitting device that is disposed between the turbine 56 and the gear set 64, and in certain configurations the first planetary gear set 64. The passive one-way torque transmitting device is configured to disconnect the hydrodynamic coupling apparatus 38 from the gear set 64, and in certain configurations the first planetary gear set 64.

Turning to FIGS. 2-6, the electro-mechanical drive unit 36A-E may be a series hybrid arrangement. The series hybrid arrangement generally refers to an arrangement where mechanical power (for example, the engine torque 18) from the prime mover, such as the combustion engine 14, is converted to electrical power (for example, current/electricity) by the first electric machine 40, and the electrical power via the first electric machine 40 is sent to the second electric machine 42 where the second electric machine 42 converts the electrical power back to mechanical power (for example, the motor torque 41) to propel the vehicle 10. The second electric machine 42 in this arrangement may propel the vehicle 10 using the electrical power supplied from the energy storage system 44 such as the batteries 46. The second electric machine 42 may also convert the mechanical power (for example, the engine torque 18) from the output shaft 24 of the engine 14 to recharge the energy storage system 44 during times of negative propulsion power such as when the vehicle 10 is decelerating or the vehicle 10 is descending a grade. In some cases a torque transmitting device 76 is added to the series hybrid arrangement to directly couple of the prime mover (for example, the engine 14) to the output member 22 to provide the mechanical power (for example, the output torque 30) to propel the vehicle 10. The torque transmitting device 76 is discussed further below.

Continuing with FIGS. 2-6, in these arrangements, the input member 20 is connected to the impeller 54, and the first electric machine 40 is connected to the impeller 54. Therefore, the engine torque 18 from the engine 14 may be transferred to the impeller 54. Also, when the first electric machine 40 operates as the motor, the first electric machine 40 may rotate the impeller 54 to produce the motor torque 41 that is transferred through the hydrodynamic coupling apparatus 38 and ultimately to the output member 22.

Figure 2:
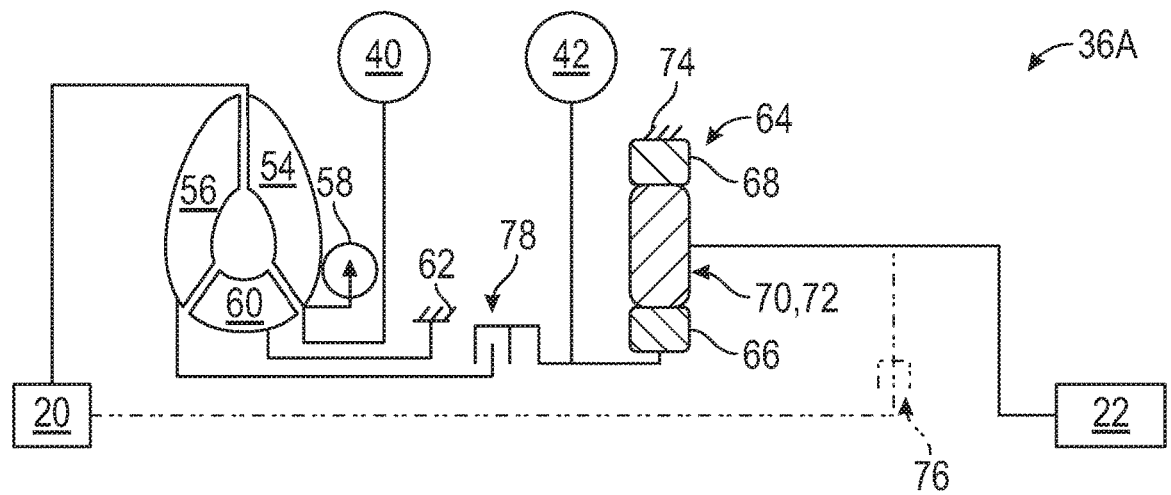
FIG. 2 is a schematic representation of the electro-mechanical drive unit of a first configuration.
Figure 3:
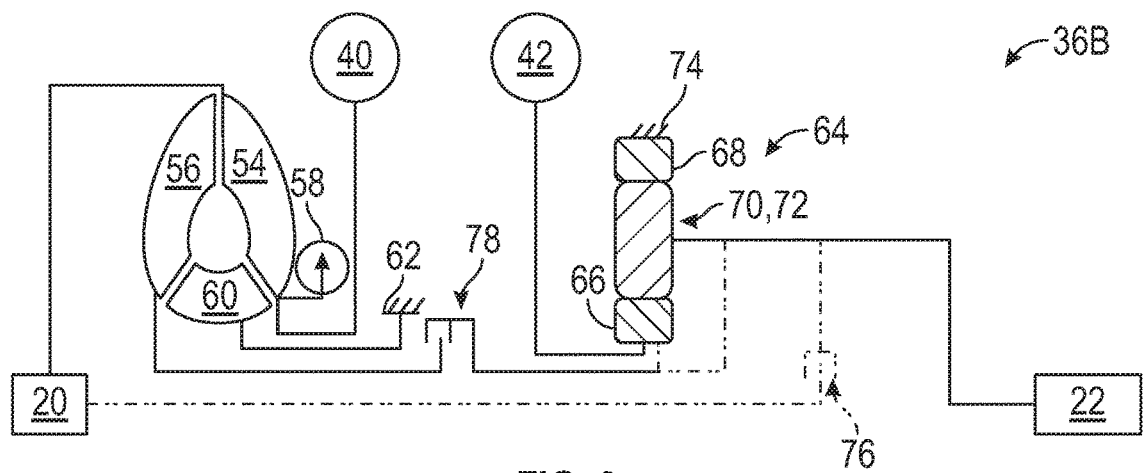
FIG. 3 is a schematic representation of the electro-mechanical drive unit of a second configuration.
Figure 4:
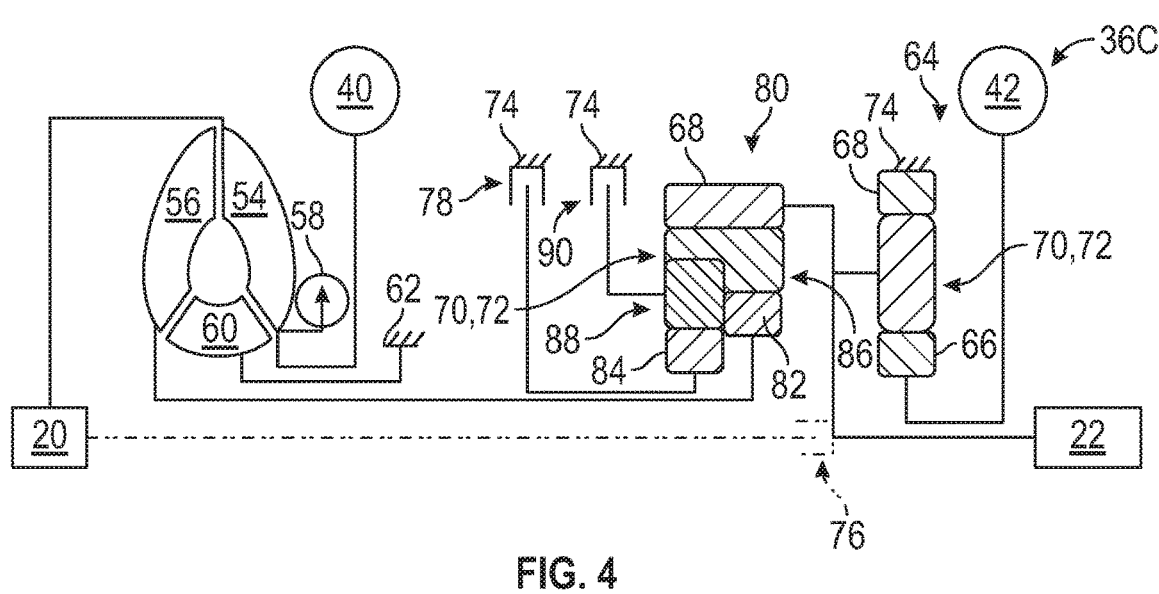
FIG. 4 is a schematic representation of the electro-mechanical drive unit of a third configuration.
Figure 5:
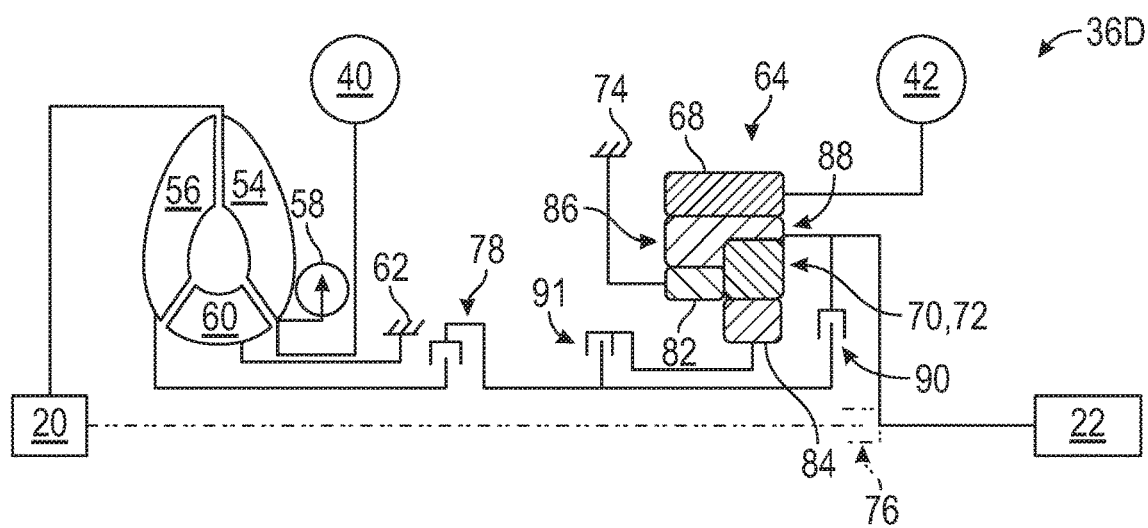
FIG. 5 is a schematic representation of the electro-mechanical drive unit of a fourth configuration.

Referring to FIGS. 2-4, the first planetary gear set 64 may include the sun gear member 66, the ring gear member 68 and the carrier member 70 that supports the plurality of pinion gears 72 that mesh with both the ring gear member 68 and the sun gear member 66. Furthermore, in these arrangements, the second electric machine 42 is connected to the sun gear member 66 of the first planetary gear set 64, and the output member 22 is connected to the carrier member 70 of the first planetary gear set 64.

As shown in phantom lines (dash-dot-dot-dash lines) in FIGS. 2-6, the electro-mechanical drive unit 36A-E may optionally include the torque transmitting device 76 disposed between the input member 20 and the output member 22. The torque transmitting device 76 is configured to connect the input member 20 and the output member 22 when the torque transmitting device 76 is engaged which bypasses the hydrodynamic coupling apparatus 38. When this torque transmitting device 76 is engaged, the engine torque 18 from the engine 14 is directly transferred to the output member 22 of the transmission 16 and then to the wheels 34, which may be used for a highway mode of the vehicle 10. The torque transmitting device 76 may include a clutch, such as a lock-up clutch, a torque converter clutch (TCC), a one-way clutch, an active clutch, a passive clutch or any other suitable torque transmitting device.

Turning to FIG. 2, the first electric machine 40 is directly connected to the impeller 54 of the hydrodynamic coupling apparatus 38, and the second electric machine 42 is indirectly connected to the turbine 56 of the hydrodynamic coupling apparatus 38. Optionally, the first electric machine 40 may include reduction gearing if desired.

Continuing with FIG. 2, the electro-mechanical drive unit 36A may optionally include the first torque transmitting device 78 connected to the turbine 56 and the second electric machine 42. The first torque transmitting device 78 may be disposed between the turbine 56 and the second electric machine 42. Therefore, the second electric machine 42 is indirectly connected to the turbine 56 of the hydrodynamic coupling apparatus 38 through the first torque transmitting device 78. The first torque transmitting device 78 is operable to selectively disconnect the hydrodynamic coupling apparatus 38 from the first planetary gear set 64. As non-limiting examples, the first torque transmitting device 78 may include a clutch, such as a lock-up clutch, a torque converter clutch (TCC), a one-way clutch, an active clutch or any other suitable torque transmitting device. As another non-limiting example, the first torque transmitting device 78 may include the passive one-way torque transmitting device that is disposed between the turbine 56 and the first planetary gear set 64. The passive one-way torque transmitting device is configured to disconnect the hydrodynamic coupling apparatus 38 from the first planetary gear set 64.

Continuing with FIG. 2, the second electric machine 42 may be disposed between the first torque transmitting device 78 and the first planetary gear set 64. The second electric machine 42 is directly connected to the sun gear member 66 of the first planetary gear set 64. Therefore, the second electric machine 42 may be disposed between the first torque transmitting device 78 and the sun gear member 66 of the first planetary gear set 64. Furthermore, the output member 22 is directly connected to the carrier member 70 of the first planetary gear set 64. Therefore, torque from the second electric machine 42 and torque from the turbine 56 may be transferred to the output member 22 through the sun gear member 66 and the carrier member 70 of the first planetary gear set 64.

Turning to FIG. 3, in this configuration, the electro-mechanical drive unit 36B may optionally include the first torque transmitting device 78 connected to the turbine 56 and either the first planetary gear set 64 or the output member 22. The first torque transmitting device 78 may be disposed between the turbine 56 and the output member 22. The first torque transmitting device 78 is operable to selectively disconnect the hydrodynamic coupling apparatus 38 from the first planetary gear set 64. As non-limiting examples, the first torque transmitting device 78 may include a clutch, such as a lock-up clutch, a torque converter clutch (TCC), a one-way clutch, an active clutch or any other suitable torque transmitting device. As another non-limiting example, the first torque transmitting device 78 may include the passive one-way torque transmitting device that is disposed between the turbine 56 and the first planetary gear set 64. The passive one-way torque transmitting device is configured to disconnect the hydrodynamic coupling apparatus 38 from the first planetary gear set 64.

Continuing with FIG. 3, the first electric machine 40 is directly connected to the impeller 54 of the hydrodynamic coupling apparatus 38, and the second electric machine 42 is indirectly connected to the turbine 56 of the hydrodynamic coupling apparatus 38. Optionally, the first electric machine 40 may include reduction gearing if desired. Additionally, the second electric machine 42 is directly connected to the sun gear member 66 of the first planetary gear set 64. In certain configurations, the turbine 56 is connected to the carrier member 70 of the first planetary gear set 64. In other configurations, the turbine 56 is connected to the sun gear member 66 of the first planetary gear set 64. The different ways to connect the turbine 56 and the first planetary gear set 64 are shown in phantom lines in FIG. 3. Furthermore, in various configurations, the turbine 56 is directly connected to the sun gear member 66 or the carrier member 70 of the first planetary gear set 64. Therefore, the second electric machine 42 is indirectly connected to the turbine 56 of the hydrodynamic coupling apparatus 38 through the sun gear member 66 or the carrier member 70 of the first planetary gear set 64.

Continuing with FIG. 3, the output member 22 is directly connected to the carrier member 70 of the first planetary gear set 64. Therefore, the motor torque 41 from the second electric machine 42 may be transferred to the output member 22 through the sun gear member 66 and the carrier member 70 of the first planetary gear set 64, and the engine torque 18 from the turbine 56 may be transferred to the output member 22 through the sun gear member 66 and/or the carrier member 70 of the first planetary gear set 64.

Turning to FIG. 4, in this configuration, the first torque transmitting device 78 of FIG. 2 is eliminated. The first electric machine 40 is directly connected to the impeller 54 of the hydrodynamic coupling apparatus 38, and the second electric machine 42 is indirectly connected to the turbine 56 of the hydrodynamic coupling apparatus 38. Optionally, the first electric machine 40 may include reduction gearing if desired.

Continuing with FIG. 4, the electro-mechanical drive unit 36C may include a second planetary gear set 80. The second planetary gear set 80 may be a different configuration than the first planetary gear set 64. The second planetary gear set 80 may include a first sun gear member 82, a second sun gear member 84, a ring gear member 68 and a carrier member 70 that supports a first group 86 of pinion gears 72 and a second group 88 of pinion gears 72. The first and second groups 86, 88 of pinion gears 72 mesh with each other. Additionally, the first group 86 of pinion gears 72 mesh with the ring gear member 68 and the first sun gear member 82, and the second group 88 of pinion gears 72 mesh with the second sun gear member 84.

Again continuing with FIG. 4, in this configuration, the ring gear member 68 of the second planetary gear set 80 is not grounded to the housing 74 of the transmission 16. The ring gear member 68 of the second planetary gear set 80 is connected to the carrier member 70 of the first planetary gear set 64. The turbine 56 is connected to the first sun gear member 82 of the second planetary gear set 80. In certain configurations, the turbine 56 is directly connected to the first sun gear member 82 of the second planetary gear set 80.

Continuing with FIG. 4, the electro-mechanical drive unit 36C may include a first torque transmitting device 78 configured to connect the second sun gear member 84 of the second planetary gear set 80 to ground when the first torque transmitting device 78 is engaged. Additionally, the electro-mechanical drive unit 36C may include a second torque transmitting device 90 configured to connect the carrier member 70 of the second planetary gear set 80 to ground when the second torque transmitting device 90 is engaged. The first torque transmitting device 78 may be engaged to ground the second sun gear member 84 of the second planetary gear set 80 when the vehicle 10 is in a drive or forward mode, and the second torque transmitting device 90 may be engaged to ground the carrier member 70 of the second planetary gear set 80 when the vehicle 10 is in a reverse mode. The first and second torque transmitting device 90 may be engaged to ground the respective components of the second planetary gear set 80 to the housing 74. The first and second torque transmitting device 78, 90 may include a clutch, such as a lock-up clutch, a torque converter clutch (TCC), a one-way clutch, an active clutch, a passive clutch or any other suitable torque transmitting device. The first and second torque transmitting devices 78, 90 may be the same or different from each other.

Again continuing with FIG. 4, the second electric machine 42 is indirectly connected to the turbine 56 through the first and second planetary gear sets 80. Additionally, the output member 22 is directly connected to the carrier member 70 of the first planetary gear set 64 and the ring gear member 68 of the second planetary gear set 80. Therefore, the motor torque 41 from the second electric machine 42 may be transferred to the output member 22 through the carrier member 70 of the first planetary gear set 64, and the engine torque 18 from the turbine 56 may be transferred to the output member 22 through the second planetary gear set 80.

Figure 6:
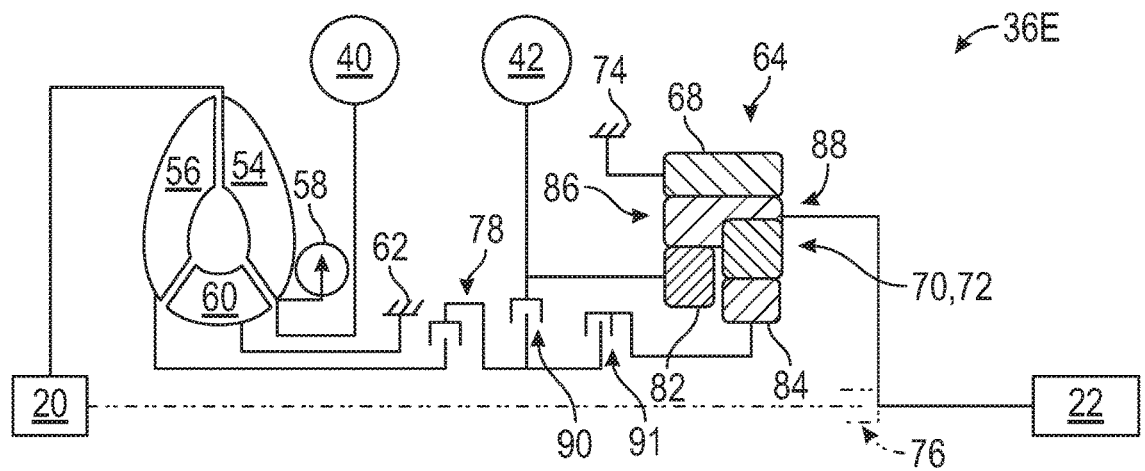
FIG. 6 is a schematic representation of the electro-mechanical drive unit of a fifth configuration.

Turning to FIGS. 5 and 6, the electro-mechanical drive unit 36D-E may optionally include the first torque transmitting device 78 coupled to the turbine 56 and the gear set 64, and in certain configurations the first planetary gear set 64. The first planetary gear set 64 of this configuration is different from the first planetary gear set 64 of FIGS. 2-4. The first planetary gear set 64 of FIGS. 5 and 6 may include a first sun gear member 82, a second sun gear member 84, a ring gear member 68 and a carrier member 70 that supports a first group 86 of pinion gears 72 and a second group 88 of pinion gears 72. The first and second groups 86, 88 of pinion gears 72 mesh with each other. The first group 86 of pinion gears 72 mesh with the ring gear member 68 and the first sun gear member 82, and the second group 88 of pinion gears 72 mesh with the second sun gear member 84. In these configurations, the output member 22 is connected to the carrier member 70 of the first planetary gear set 64.

Continuing with FIGS. 5 and 6, more specifically, the first torque transmitting device 78 may be connected to the turbine 56 and one or more torque transmitting devices (discussed further below). The first torque transmitting device 78 may be disposed between the turbine 56 and the one or more torque transmitting devices. The first torque transmitting device 78 is operable to selectively disconnect the hydrodynamic coupling apparatus 38 from the first planetary gear set 64. As non-limiting examples, the first torque transmitting device 78 may include a clutch, such as a lock-up clutch, a torque converter clutch (TCC), a one-way clutch, an active clutch or any other suitable torque transmitting device. As another non-limiting example, the first torque transmitting device 78 may include the passive one-way torque transmitting device that is disposed between the turbine 56 and the first planetary gear set 64. The passive one-way torque transmitting device is configured to disconnect the hydrodynamic coupling apparatus 38 from the first planetary gear set 64.

Turning to FIG. 5, the electro-mechanical drive unit 36D may include a forward torque transmitting device 90, and may also be referred to as a second torque transmitting device 90 for this configuration. The forward torque transmitting device 90 is connected to the carrier member 70 of the first planetary gear set 64. The forward torque transmitting device 90 includes an engaged position to transfer the engine torque 18 in a forward mode. The second torque transmitting device 90 may be engaged (in the engaged position) to connect the turbine 56 to the carrier member 70 of the first planetary gear set 64 when the vehicle 10 is in the forward mode or drive mode. The second torque transmitting device 90 or the forward torque transmitting device 90 may be connected to the carrier member 70 and the first torque transmitting device 78.

Additionally, the electro-mechanical drive unit 36D may include a reverse torque transmitting device 91, and may also be referred to as a third torque transmitting device 91 for this configuration. The reverse torque transmitting device 91 is connected to the second sun gear member 84 of the first planetary gear set 64. The reverse torque transmitting device 91 includes an engaged position to transfer the engine torque 18 in a reverse mode. The reverse or third torque transmitting device 91 may be engaged (in the engaged position) to connect the turbine 56 to the second sun gear member 84 of the first planetary gear set 64 when the vehicle 10 is in the reverse mode. The forward mode and the reverse mode are different. Generally, the forward mode is when the vehicle 10 propels forward, and the reverse mode is when the vehicle 10 propels backwards or in reverse. The forward and reverse torque transmitting devices 90, 91 are coupled to the turbine 56. The forward and reverse torque transmitting devices 90, 91 each include an open position to disconnect the turbine 56 from the output member 22. The third torque transmitting device 91 or the reverse torque transmitting device 91 may be connected to the second sun gear member 84 of the first planetary gear set 64 and the first torque transmitting device 78. Therefore, the first torque transmitting device 78 is connected to the turbine 56 and the second and/or third torque transmitting device 90, 91.

Furthermore, the turbine 56 is coupled to the carrier member 70 of the first planetary gear set 64 through the first torque transmitting device 78. The ring gear member 68 of the first planetary gear set 64 is connected to the second electric machine 42. The ring gear member 68 of the first planetary gear set 64 is not grounded to the housing 74. Additionally, the first sun gear member 82 is grounded. More specifically, the first sun gear member 82 is grounded to the housing 74. Therefore, the motor torque 41 from the second electric machine 42 may be transferred to the output member 22 through the ring gear member 68 and the carrier member 70 of the first planetary gear set 64, and the engine torque 18 from the turbine 56 may be transferred to the output member 22 through the first planetary gear set 64.

Turning to FIG. 6, the electro-mechanical drive unit 36E may include a forward torque transmitting device 90, and may also be referred to as a second torque transmitting device 90 for this configuration. The forward torque transmitting device 90 is connected to the second electric machine 42. The forward torque transmitting device 90 includes an engaged position to transfer the engine torque 18 in a forward mode. The second torque transmitting device 90 may be engaged (in the engaged position) to connect the turbine 56 to the second electric machine 42 when the vehicle 10 is in the forward mode or drive mode. The second torque transmitting device 90 or the forward torque transmitting device 90 may be connected to the second electric machine 42 and the first torque transmitting device 78.

Additionally, the electro-mechanical drive unit 36E may include a reverse torque transmitting device 91, and may also be referred to as a third torque transmitting device 91 for this configuration. The reverse torque transmitting device 91 is connected to the second sun gear member 84 of the first planetary gear set 64. The reverse torque transmitting device 91 includes an engaged position to transfer the engine torque 18 in a reverse mode. The reverse or third torque transmitting device 91 may be engaged (in the engaged position) to connect the turbine 56 to the second sun gear member 84 of the first planetary gear set 64 when the vehicle 10 is in a reverse mode. The forward mode and the reverse mode are different. Generally, the forward mode is when the vehicle 10 propels forward, and the reverse mode is when the vehicle propels backwards or in reverse. The forward and reverse torque transmitting devices 90, 91 are coupled to the turbine 56. The forward and reverse torque transmitting devices 90, 91 each include an open position to disconnect the turbine 56 from the output member 22. The third torque transmitting device 91 or the reverse torque transmitting device 91 may be connected to the second sun gear member 84 of the first planetary gear set 64 and the first torque transmitting device 78. Therefore, the first torque transmitting device 78 is connected to the turbine 56 and the second and/or third torque transmitting device 90, 91.

Continuing with FIG. 6, the first sun gear member 82 of the first planetary gear set 64 is connected to the second electric machine 42. The ring gear member 68 of the first planetary gear set 64 is grounded. More specifically, the ring gear member 68 is grounded to the housing 74. Therefore, the motor torque 41 from the second electric machine 42 may be transferred to the output member 22 through the first sun gear member 82 and the carrier member 70 of the first planetary gear set 64, and the engine torque 18 from the turbine 56 may be transferred to the output member 22 through the first planetary gear set 64.

Turning to FIGS. 7-10, the electro-mechanical drive unit 36F-I may be an input-split hybrid arrangement. The input-split hybrid arrangement generally refers to an arrangement where the mechanical power (for example, the engine torque 18) from the prime mover, such as the combustion engine 14, is split into two paths by a gearing arrangement. The mechanical power is split such that a portion of the power passes to the output member 22 mechanically (via the engine torque 18) and another portion of the power passes to the output member 22 electrically (via the motor torque 41). The amount of power passing through each of the paths is dependent on the speed ratio between the prime mover (for example, the engine 14) and the output member 22. The speed of the output member 22 (for example, which transmits the output torque 30) is proportional to the speed of the second electric machine 42 (for example, which produces the motor torque 41).

Continuing with FIGS. 7-10, in these arrangements, the input member 20 is connected to the impeller 54, and the first electric machine 40 is not directly connected to the impeller 54. Therefore, the engine torque 18 from the engine 14 may be transferred to the impeller 54. The electro-mechanical drive unit 36F-I may include a second planetary gear set 80. The second planetary gear set 80 may be a different configuration than the first planetary gear set 64. The second planetary gear set 80 may be coupled to the first planetary gear set 64. The first electric machine 40 may be connected to the second planetary gear set 80. Furthermore, the output member 22 is connected to the second planetary gear set 80.

Figure 7:
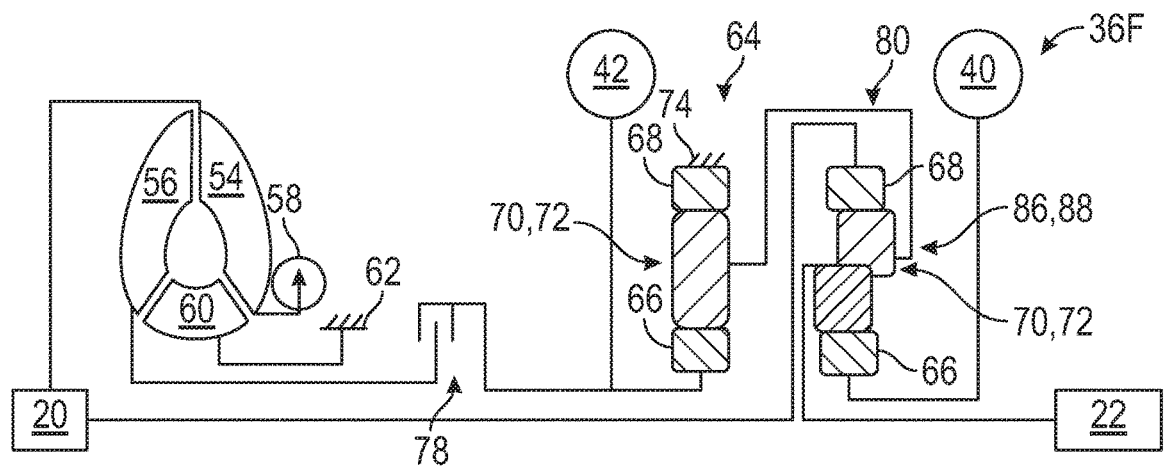
FIG. 7 is a schematic representation of the electro-mechanical drive unit of a sixth configuration.
Figure 8:
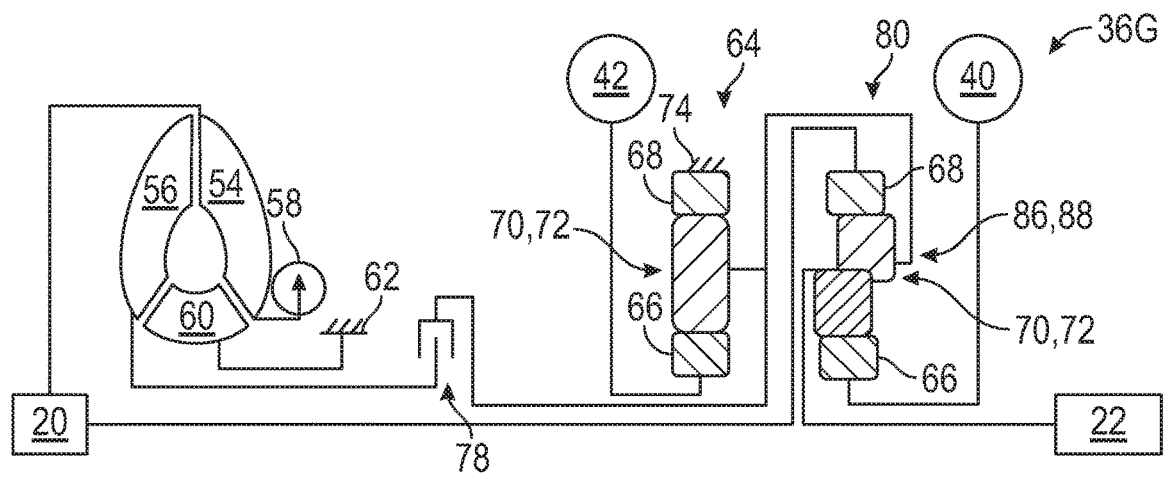
FIG. 8 is a schematic representation of the electro-mechanical drive unit of a seventh configuration.
Figure 9:
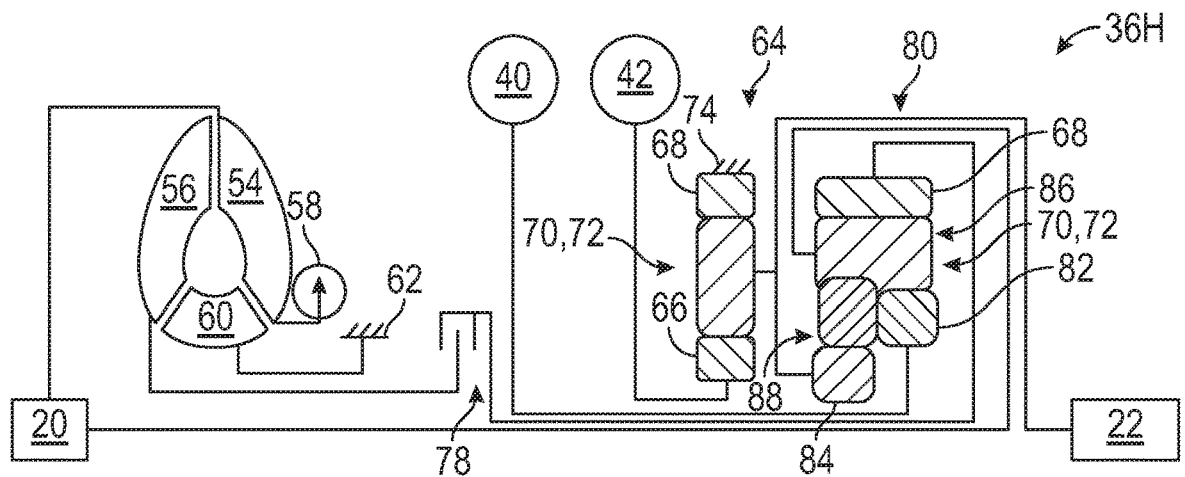
FIG. 9 is a schematic representation of the electro-mechanical drive unit of an eighth configuration.
Figure 10:
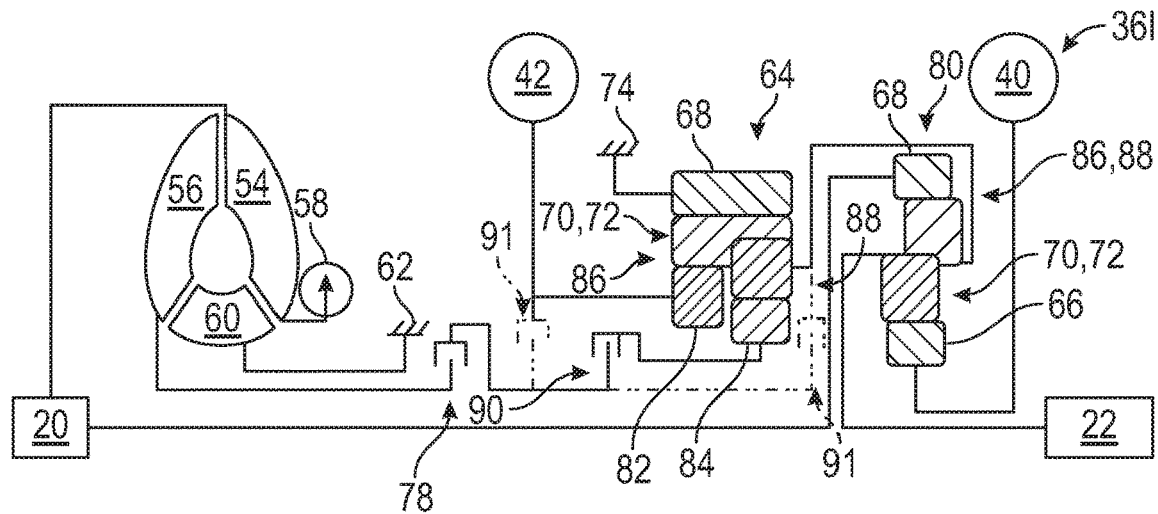
FIG. 10 is a schematic representation of the electro-mechanical drive unit of a ninth configuration

Furthermore, referring to FIGS. 7-9, the second electric machine 42 is connected to the sun gear member 66 of the first planetary gear set 64, and referring to FIG. 10, the second electric machine 42 is connected to the first sun gear member 82 of the first planetary gear set 64. Depending on the configurations, the second electric machine 42 is directly connected to the sun gear member 66 of the first planetary gear set 64 or directly connected to the first sun gear member 82 of the first planetary gear set 64. The first planetary gear set 64 of FIGS. 7-9 is different from the first planetary gear set 64 of FIG. 10. The first planetary gear set 64 of FIGS. 7-9 may include the sun gear member 66, the ring gear member 68 and the carrier member 70 that supports the plurality of pinion gears 72 that mesh with both the ring gear member 68 and the sun gear member 66. The first planetary gear set 64 of FIG. 10 may include a first sun gear member 82, a second sun gear member 84, a ring gear member 68 and a carrier member 70 that supports a first group 86 of pinion gears 72 and a second group 88 of pinion gears 72. The first and second groups 86, 88 of pinion gears 72 mesh with each other. The first group 86 of pinion gears 72 mesh with the ring gear member 68 and the first sun gear member 82, and the second group 88 of pinion gears 72 mesh with the second sun gear member 84.

Turning to FIGS. 7 and 8, the electro-mechanical drive unit 36F-G may include a second planetary gear set 80 that includes a sun gear member 66, a ring gear member 68 and a carrier member 70 that supports a first group 86 of pinion gears 72 and a second group 88 of pinion gears 72. The first group 86 of pinion gears 72 and the second group 88 of pinion gears 72 mesh with each other. Additionally, the first group 86 of pinion gears 72 mesh with the ring gear member 68, and the second group 88 of pinion gears 72 mesh with the sun gear member 66.

In the configurations of FIGS. 7 and 8, the ring gear member 68 of the second planetary gear set 80 is not grounded to the housing 74 of the transmission 16. The carrier member 70 of the first planetary gear set 64 is connected to the carrier member 70 of the second planetary gear set 80. The sun gear member 66 of the second planetary gear set 80 is connected to the first electric machine 40. In certain configurations, the sun gear member 66 of the second planetary gear set 80 is directly connected to the first electric machine 40.

Continuing with FIGS. 7 and 8, the input member 20 may also be connected to the ring gear member 68 of the second planetary gear set 80. The output member 22 is connected to the carrier member 70 of the second planetary gear set 80. In certain configurations, the output member 22 is directly connected to the carrier member 70 of the second planetary gear set 80. Furthermore, the output member 22 is coupled to the first planetary gear set 64 through the carrier member 70 of the second planetary gear set 80. Therefore, the motor torque 41 from the second electric machine 42 may be transferred to the output member 22 through the sun gear member 66 of the first planetary gear set 64 and the carrier member 70 of the second planetary gear set 80. With regard to FIG. 7, the engine torque 18 from the turbine 56 may be transferred to the output member 22 in the same manner as the second electric machine 42 (through the sun gear member 66 of the first planetary gear set 64 and the carrier member 70 of the second planetary gear set 80). The motor torque 41 from the first electric machine 40 may be transferred to the output member 22 through the sun gear member 66 of the second planetary gear set 80.

Referring to FIGS. 7-10, the electro-mechanical drive unit 36F-I may optionally include the first torque transmitting device 78. The first torque transmitting device 78 is operable to selectively disconnect the hydrodynamic coupling apparatus 38 from the first planetary gear set 64 and the second planetary gear set 80. The first torque transmitting device 78 may include a clutch, such as a lock-up clutch, a torque converter clutch (TCC), a one-way clutch, an active clutch, a passive clutch or any other suitable torque transmitting device.

Depending on the configuration, the first torque transmitting device 78 may be in different locations in FIGS. 7-9. Referring to FIG. 7, the first torque transmitting device 78 is connected to the turbine 56 and the second electric machine 42; and additionally, the first torque transmitting device 78 is disposed between the turbine 56 and the second electric machine 42. Referring to FIG. 8, the first torque transmitting device 78 is connected to the turbine 56 and the carrier member 70 of the first planetary gear set 64; and additionally, the first torque transmitting device 78 is disposed between the turbine 56 and the carrier member 70 of the first planetary gear set 64. The location of the first torque transmitting device 78 of FIGS. 9 and 10 are discussed below.

Turning to FIG. 9, the electro-mechanical drive unit 36H may include a second planetary gear set 80 that is different from the second planetary gear set 80 discussed above for FIGS. 7 and 8. The second planetary gear set 80 of FIG. 9 may include a first sun gear member 82, a second sun gear member 84, a ring gear member 68 and a carrier member 70 that supports a first group 86 of pinion gears 72 and a second group 88 of pinion gears 72. The first and second groups 86, 88 of pinion gears 72 mesh with each other. Additionally, the first group 86 of pinion gears 72 mesh with the ring gear member 68 and the first sun gear member 82, and the second group 88 of pinion gears 72 mesh with the second sun gear member 84. In this configuration, the ring gear member 68 of the second planetary gear set 80 is not grounded to the housing 74 of the transmission 16. The second sun gear member 84 of the second planetary gear set 80 is connected to the carrier member 70 of the first planetary gear set 64.

Continuing with FIG. 9, the second electric machine 42 is connected to the sun gear member 66 of the first planetary gear set 64. The first electric machine 40 is connected to the first sun gear member 82 of the second planetary gear set 80. In certain configurations, the second electric machine 42 is directly connected to the sun gear member 66 of the first planetary gear set 64, and/or the first electric machine 40 is directly connected to the first sun gear member 82 of the second planetary gear set 80.

Again continuing with FIG. 9, the input member 20 may also be connected to the carrier member 70 of the second planetary gear set 80. The output member 22 is coupled to the first planetary gear set 64 through the carrier member 70 of the first planetary gear set 64 and the second sun gear member 84 of the second planetary gear set 80. Therefore, the output member 22 may be connected to the carrier member 70 of the first planetary gear set 64 and the second sun gear member 84 of the second planetary gear set 80. The motor torque 41 from the second electric machine 42 may be transferred to the output member 22 through the sun gear member 66 of the first planetary gear set 64. The engine torque 18 from the turbine 56 may be transferred to the output member 22 through the ring gear member 68 of the second planetary gear set 80 and the second sun gear member 84 of the second planetary gear set 80. The motor torque 41 from the first electric machine 40 may be transferred to the output member 22 through the first sun gear member 82 of the second planetary gear set 80 and the second sun gear member 84 of the second planetary gear set 80.

Turning to the first torque transmitting device 78 of FIG. 9, the first torque transmitting device 78 is connected to the turbine 56 and the ring gear member 68 of the second planetary gear set 80. The first torque transmitting device 78 is disposed between the turbine 56 and the second planetary gear set 80. In this configuration, the first torque transmitting device 78 is operable to selectively disconnect the hydrodynamic coupling apparatus 38 from the second planetary gear set 80.

Turning to FIG. 10, the second planetary gear set 80 is different from the second planetary gear set 80 discussed above for FIG. 9. The second planetary gear set 80 of FIG. 10 may include a sun gear member 66, a ring gear member 68 and a carrier member 70 that supports a first group 86 of pinion gears 72 and a second group 88 of pinion gears 72. The first group 86 of pinion gears 72 and the second group 88 of pinion gears 72 mesh with each other. The first group 86 of pinion gears 72 mesh with the ring gear member 68, and the second group 88 of pinion gears 72 mesh with the sun gear member 66. The carrier member 70 of the first planetary gear set 64 is connected to the carrier member 70 of the second planetary gear set 80.

Continuing with FIG. 10, the first electric machine 40 is connected to the sun gear member 66 of the second planetary gear set 80. The second electric machine 42 is connected to the first sun gear member 82 of the first planetary gear set 64. The output member 22 is connected to the carrier member 70 of the second planetary gear set 80.

Continuing with FIG. 10, the first torque transmitting device 78 is connected to the turbine. As non-limiting examples, the first torque transmitting device 78 may include a clutch, such as a lock-up clutch, a torque converter clutch (TCC), a one-way clutch, an active clutch or any other suitable torque transmitting device. As another non-limiting example, the first torque transmitting device 78 may include the passive one-way torque transmitting device that is disposed between the turbine 56 and the first planetary gear set 64. The passive one-way torque transmitting device is configured to disconnect the hydrodynamic coupling apparatus 38 from the first planetary gear set 64.

Again continuing with FIG. 10, the electro-mechanical drive unit 36I may also include a reverse torque transmitting device 90, and may also be referred to as a second torque transmitting device 90 for this configuration. The second torque transmitting device 90 or the reverse torque transmitting device 90 may be, in certain configurations, connected to the second sun gear member 84 of the first planetary gear set 64. More specifically, in certain configurations, the reverse or second torque transmitting device 90 may be connected to the second sun gear member 84 of the first planetary gear set 64 and the first torque transmitting device 78. The reverse torque transmitting device 90 includes an engaged position to transfer the engine torque 18 in a reverse mode. The reverse or second torque transmitting device 90 may be engaged (in the engaged position) to connect the turbine 56 to the second sun gear member 84 of the first planetary gear set 64 when the vehicle 10 is in the reverse mode. The second torque transmitting device 90 is disposed between the second sun gear member 84 of the first planetary gear set 64 and the first torque transmitting device 78. The ring gear member 68 of the first planetary gear set 64 is grounded. More specifically, the ring gear member 68 of the first planetary gear set 64 is grounded to the housing 74.

Again continuing with FIG. 10, the electro-mechanical drive unit 36I may also include a forward torque transmitting device 91, and may also be referred to as a third torque transmitting device 91 for this configuration. The forward torque transmitting device 91 includes an engaged position to transfer the engine torque 18 in a forward mode. The forward or third torque transmitting device 91 may be engaged (in the engaged position) to connect the turbine 56 to the second electric machine 42 or the carrier member 70 of the second planetary gear set 80 when the vehicle 10 is in the forward mode or drive mode. The forward mode and the reverse mode are different. Generally, the forward mode is when the vehicle 10 propels forward, and the reverse mode is when the vehicle propels backwards or in reverse. The reverse and forward torque transmitting devices 90, 91 are coupled to the turbine 56. The reverse and forward torque transmitting devices 90, 91 each include an open position to disconnect the turbine 56 from the output member 22.

The forward or third torque transmitting device 91 may be in a different location, and therefore, in FIG. 10 the different locations are illustrated in phantom lines. As one example, the forward torque transmitting device 91 or the third torque transmitting device 91 may be connected to the second electric machine 42, and additionally, the third torque transmitting device 91 may be disposed between the second electric machine 42 and the first torque transmitting device 78. More specifically, the third torque transmitting device 91 may be disposed between the first and second torque transmitting devices 78, 90. Optionally, the first torque transmitting device 78 may be used. As one non-limiting example, the first torque transmitting device 78 may include a passive one-way torque transmitting device disposed between the turbine 56 and the forward torque transmitting device 91 (when the forward torque transmitting device 91 is connected to the second electric machine 42). The passive one-way torque transmitting device is configured to disconnect the hydrodynamic coupling apparatus 38 from the first and second planetary gear sets 64, 80.

As another example, the forward torque transmitting device 91 or the third torque transmitting device 91 may be connected to the carrier member 70 of the second planetary gear set 80 (instead of the second electric machine 42), and additionally, the third torque transmitting device 91 may be disposed between the second planetary gear set 80 and the first torque transmitting device 78. More specifically, the third torque transmitting device 91 may be disposed between the second torque transmitting device 90 and the carrier member 70 of the second planetary gear set 80. Optionally, the first torque transmitting device 78 may be used. As one non-limiting example, the first torque transmitting device 78 may include a passive one-way torque transmitting device disposed between the turbine 56 and the reverse torque transmitting device 90. The passive one-way torque transmitting device is configured to disconnect the hydrodynamic coupling apparatus 38 from the first and second planetary gear sets 64, 80.

The motor torque 41 from the second electric machine 42 may be transferred to the output member 22 through the first sun gear member 82 of the first planetary gear set 64. The engine torque 18 from the turbine 56 may be transferred to the output member 22 through the first and/or second planetary gear set 64, 80. The motor torque 41 from the first electric machine 40 may be transferred to the output member 22 through the sun gear member 66 of the second planetary gear set 80.

Figure 11:
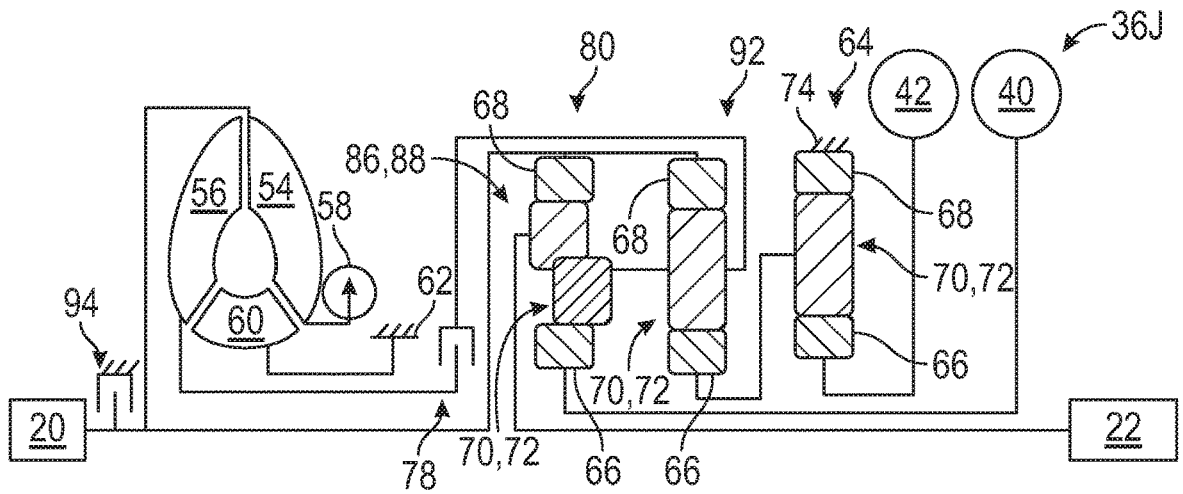
FIG. 11 is a schematic representation of the electro-mechanical drive unit of a tenth configuration.
Figure 12:
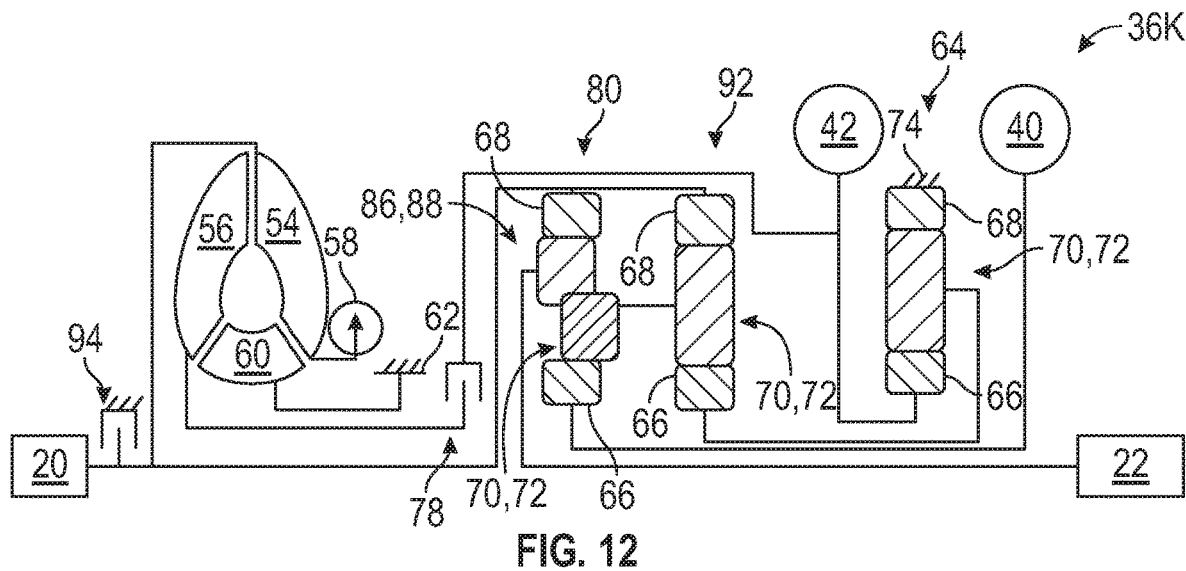
FIG. 12 is a schematic representation of the electro-mechanical drive unit of an eleventh configuration.

Turning to FIGS. 11 and 12, the electro-mechanical drive unit 36J-K may be a compound-split hybrid arrangement. The compound-split hybrid arrangement generally refers to an arrangement that combines the attributes of the input-split hybrid arrangement discussed above and the output-split hybrid arrangement that is discussed below. The speed ratio between the prime mover (for example, the engine 14) and the output member 22 determines the percentages of the mechanical power (for example, the engine torque 18) from the prime mover, such as the combustion engine 14, that splits and passes through an electrical path and a mechanical path. In the compound-split hybrid arrangement, the speed of the output member 22 (for example, the output torque 30) is not proportional to the speed of either of the first and second electric machines 40, 42, but is an algebraic linear combination of the speeds of both of the first and second electric machines 40, 42 (for example, which produces the motor torques 41). In these arrangements, the input member 20 is connected to the impeller 54, and the first electric machine 40 is not directly connected to the impeller 54. Therefore, the engine torque 18 from the engine 14 may be transferred to the impeller 54. Furthermore, the second electric machine 42 is connected to the sun gear member 66 of the first planetary gear set 64. In certain configurations, the second electric machine 42 is directly connected to the sun gear member 66 of the first planetary gear set 64. As discussed above, the first planetary gear set 64 may include the sun gear member 66, the ring gear member 68 and the carrier member 70 that supports the plurality of pinion gears 72 that mesh with both the ring gear member 68 and the sun gear member 66.

Continuing with FIGS. 11 and 12, the electro-mechanical drive unit 36J-K may include a second planetary gear set 80 that includes a sun gear member 66, a ring gear member 68 and a carrier member 70 that supports a first group 86 of pinion gears 72 and a second group 88 of pinion gears 72. The first group 86 of pinion gears 72 and the second group 88 of pinion gears 72 mesh with each other. Additionally, the first group 86 of pinion gears 72 mesh with the ring gear member 68, and the second group 88 of pinion gears 72 mesh with the sun gear member 66. In this configuration, the ring gear member 68 of the second planetary gear set 80 is not grounded to the housing 74 of the transmission 16.

Additionally, as shown in FIGS. 11 and 12, the electro-mechanical drive unit 36J-K may include a third planetary gear set 92 that is different from the second planetary gear set 80. The third planetary gear set 92 may include a sun gear member 66, a ring gear member 68 and a carrier member 70 that supports a plurality of pinion gears 72 that mesh with both the ring gear member 68 and the sun gear member 66. In this configuration, the ring gear member 68 of the third planetary gear set 92 is not grounded to the housing 74 of the transmission 16.

Continuing with FIGS. 11 and 12, the first electric machine 40 is connected to the sun gear member 66 of the second planetary gear set 80. In certain configurations, the first electric machine 40 is directly connected to the sun gear member 66 of the second planetary gear set 80. The third planetary gear set 92 is disposed between the first and second planetary gear sets 80. The carrier member 70 of the second planetary gear set 80 is connected to the carrier member 70 of the third planetary gear set 92. The carrier member 70 of the first planetary gear set 64 is connected to the sun gear member 66 of the third planetary gear set 92.

Referring to FIGS. 11 and 12, the electro-mechanical drive unit 36J-K may optionally include the first torque transmitting device 78. The first torque transmitting device 78 is operable to selectively disconnect the hydrodynamic coupling apparatus 38 from the first planetary gear set 64, the second planetary gear set 80 and third planetary gear sets 92. The first torque transmitting device 78 may include a clutch, such as a lock-up clutch, a torque converter clutch (TCC), a one-way clutch, an active clutch, a passive clutch or any other suitable torque transmitting device.

Depending on the configuration, the first torque transmitting device 78 may be in different locations in FIGS. 11 and 12. Referring to FIG. 11, the first torque transmitting device 78 is connected to the turbine 56 and the carrier member 70 of the third planetary gear set 92; and additionally, the first torque transmitting device 78 is disposed between the turbine 56 and the third planetary gear set 92. Referring to FIG. 12, the first torque transmitting device 78 is connected to the turbine 56 and the second electric machine 42; and additionally, the first torque transmitting device 78 is disposed between the turbine 56 and the second electric machine 42.

Continuing with FIGS. 11 and 12, the input member 20 may also be connected to the ring gear member 68 of the second planetary gear set 80 and the ring gear member 68 of the third planetary gear set 92. The output member 22 is coupled to the first planetary gear set 64 through the second and third planetary gear sets 80, 92. The output member 22 is connected to the carrier member 70 of the second planetary gear set 80. In certain configurations, the output member 22 is directly connected to the carrier member 70 of the second planetary gear set 80. The motor torque 41 from the second electric machine 42 may be transferred to the output member 22 through the sun gear member 66 of the first planetary gear set 64, to the sun gear member 66 of the third planetary gear set 92 and out the carrier member 70 of the second planetary gear set 80.

With regard to FIG. 11, the engine torque 18 from the turbine 56 may be transferred to the output member 22 through the carrier member 70 of the third planetary gear, and to the carrier member 70 of the second planetary gear set 80. With regard to FIG. 12, the engine torque 18 from the turbine 56 may be transferred to the output member 22 in the same manner as the second electric machine 42 (through the sun gear member 66 of the first planetary gear set 64, to the sun gear member 66 of the third planetary gear set 92 and out the carrier member 70 of the second planetary gear set 80). With regard to FIGS. 11 and 12, the motor torque 41 from the first electric machine 40 may be transferred to the output member 22 through the sun gear member 66 of the second planetary gear set 80.

In certain configurations, the input member 20 is connected to the impeller 54 without a torque transmitting device therebetween (see, for example, FIGS. 2-10 and 13), and in other configurations, another torque transmitting device 94 (see, for example, FIGS. 11 and 12) is connected between the input member 20 and the engine 14. The first torque transmitting device 78 is operable to selectively disconnect the engine 14 from the transmission 16. When the engine 14 is disconnected from the EVT, the first and/or second electric machines 40, 42 alone may provide the output torque 30 to drive the wheels 34. The first torque transmitting device 78 may include a clutch, such as a lock-up clutch, a torque converter clutch (TCC), a one-way clutch, an active clutch, a passive clutch or any other suitable torque transmitting device.

Figure 13:
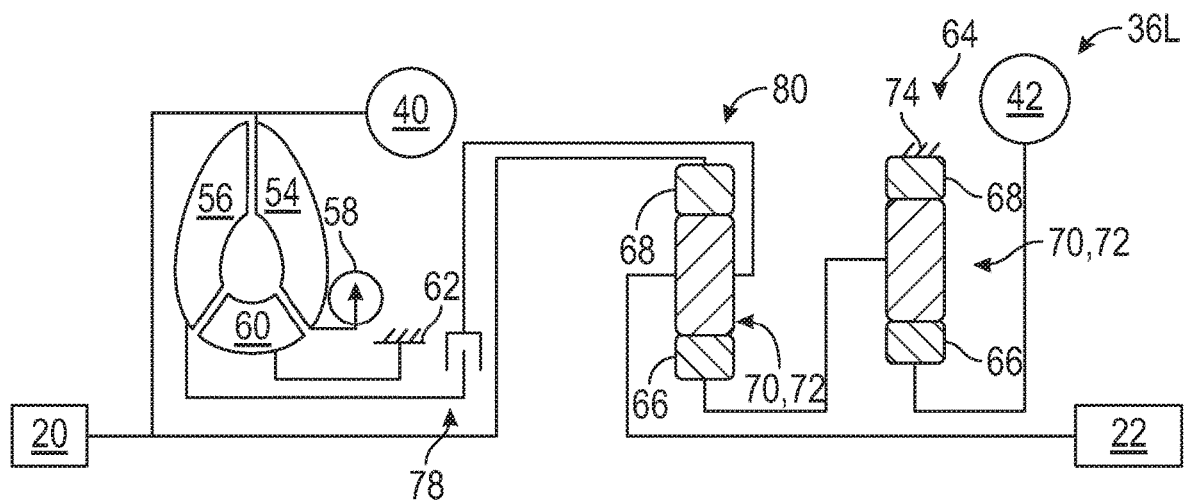
FIG. 13 is a schematic representation of the electro-mechanical drive unit of a twelfth configuration.

Turning to FIG. 13, the electro-mechanical drive unit 36L may be an output-split hybrid arrangement. The output-split hybrid arrangement generally refers to an arrangement where the prime mover (for example, the engine 14) provides the mechanical power (for example, the engine torque 18) to both the first electrical machine 40 and a gearing arrangement. The mechanical power (for example, the engine torque 18) from the prime mover (for example, the engine 14) is split between electrical power (via the motor torque 41) and mechanical power (via the engine torque 18), which recombines in the gearing arrangement to output as the output torque 30 to propel the vehicle 10. The speed of the output member 22 (for example, the output torque 30) is an algebraic linear combination of the speed of the prime mover (for example, the engine torque 18) and the speed of the second electric machine 42 (for example, which produces the motor torque 41). In this arrangement, the input member 20 is connected to the impeller 54, and the first electric machine 40 is connected to the impeller 54. In certain configurations, the first electric machine 40 is directly connected to the impeller 54. Therefore, the engine torque 18 from the engine 14 may be transferred to the impeller 54. Also, when the first electric machine 40 operates as the motor, the first electric machine 40 may rotate the impeller 54 to transfer the motor torque 41 through the hydrodynamic coupling apparatus 38.

Continuing with FIG. 13, the second electric machine 42 is connected to the sun gear member 66 of the first planetary gear set 64. In certain configurations, the second electric machine 42 is directly connected to the sun gear member 66 of the first planetary gear set 64. As discussed above, the first planetary gear set 64 may include the sun gear member 66, the ring gear member 68 and the carrier member 70 that supports the plurality of pinion gears 72 that mesh with both the ring gear member 68 and the sun gear member 66.

Again continuing with FIG. 13, the electro-mechanical drive unit 36L may also include a second planetary gear set 80 that includes a sun gear member 66, a ring gear member 68, a carrier member 70 that supports a plurality of pinion gears 72 that mesh with both the ring gear member 68 and the sun gear member 66. In this configuration, the ring gear member 68 of the second planetary gear set 80 is not grounded to the housing 74 of the transmission 16.

Continuing with FIG. 13, the electro-mechanical drive unit 36L may optionally include the first torque transmitting device 78 connected to the turbine 56 and the carrier member 70 of the second planetary gear set 80. The first torque transmitting device 78 is operable to selectively disconnect the hydrodynamic coupling apparatus 38 from the second planetary gear set 80. The first torque transmitting device 78 is disposed between the turbine 56 and the second planetary gear set 80. The first torque transmitting device 78 may include a clutch, such as a lock-up clutch, a torque converter clutch (TCC), a one-way clutch, an active clutch, a passive clutch or any other suitable torque transmitting device.

Continuing with FIG. 13, the second electric machine 42 is connected to the sun gear member 66 of the first planetary gear set 64. The carrier member 70 of the first planetary gear set 64 is connected to the sun gear member 66 of the second planetary gear set 80. The input member 20 may also be connected to the ring gear member 68 of the second planetary gear set 80.

Again continuing with FIG. 13, the output member 22 is coupled to the first planetary gear set 64 through the carrier member 70 of the second planetary gear set 80. The output member 22 is connected to the carrier member 70 of the second planetary gear set 80. In certain configurations, the output member 22 is directly connected to the carrier member 70 of the second planetary gear set 80. The motor torque 41 from the second electric machine 42 may be transferred to the output member 22 through the sun gear member 66 of the first planetary gear set 64, to the sun gear member 66 of the second planetary gear set 80 and out the carrier member 70 of the second planetary gear set 80. The engine torque 18 from the turbine 56 may be transferred to the output member 22 through the carrier member 70 of the second planetary gear.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electro-mechanical drive unit comprising:
    a first electric machine operable as a motor to produce motor torque or as a generator to produce energy;

a second electric machine operable as a motor to produce motor torque or as a generator to produce energy;

wherein the first and second electric machines are in electrical communication with each other;

a gear set mechanically coupled to one of the first electric machine and the second electric machine;

an output member coupled to the gear set;

a hydrodynamic coupling apparatus including an impeller and a turbine fluidly connected to the impeller, and configured to transfer engine torque;

an input member connected to the impeller, and the turbine is indirectly connected to the gear set; and wherein:
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;

the hydrodynamic coupling apparatus is configured to transfer the engine torque during a predetermined first condition;

the first electric machine and/or the second electric machine produce the motor torque during the predetermined first condition;

the first electric machine and/or the second electric machine produce the motor torque during a predetermined second condition without the hydrodynamic coupling apparatus operating;

the second condition is different from the first condition; and a passive one-way torque transmitting device disposed between the turbine and the gear set, and wherein the passive one-way torque transmitting device is configured to disconnect the hydrodynamic coupling apparatus from the gear set.

2. The drive unit as set forth in claim 1 wherein the hydrodynamic coupling apparatus is further defined as a torque converter assembly that includes the impeller and the turbine, and further includes a stator apparatus.

3. The drive unit as set forth in claim 1 wherein the first electric machine is connected to the impeller.

4. The drive unit as set forth in claim 3 wherein:
the gear set is a planetary gear set that includes a sun gear member, a ring gear member and a carrier member that supports a plurality of pinion gears that mesh with both the ring gear member and the sun gear member;

the second electric machine is connected to the sun gear member of the planetary gear set; and the output member is connected to the carrier member of the planetary gear set.

5. The drive unit as set forth in claim 4:
further including a first torque transmitting device connected to the turbine and the second electric machine, and the first torque transmitting device is disposed between the turbine and the second electric machine; and wherein the second electric machine is disposed between the first torque transmitting device and the planetary gear set.

6. The drive unit as set forth in claim 4 wherein the turbine is connected to the carrier member of the planetary gear set.

7. The drive unit as set forth in claim 4 wherein the turbine is connected to the sun gear member of the planetary gear set.

8. The drive unit as set forth in claim 1:
further including a first torque transmitting device coupled to the turbine and the gear set;

wherein the gear set is a planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member; and wherein the output member is connected to the carrier member of the planetary gear set.

9. The drive unit as set forth in claim 8:
wherein the ring gear member is connected to the second electric machine;

wherein the turbine is coupled to the carrier member through the first torque transmitting device;

further including a second torque transmitting device connected to the carrier member and the first torque transmitting device;

further including a third torque transmitting device connected to the second sun gear member and the first torque transmitting device; and wherein the first sun gear member is grounded.

10. The drive unit as set forth in claim 8:
wherein the first sun gear member is connected to the second electric machine;

further including a second torque transmitting device connected to the second electric machine and the first torque transmitting device;

further including a third torque transmitting device connected to the second sun gear member and the first torque transmitting device; and wherein the ring gear member is grounded.

11. The drive unit as set forth in claim 1:
wherein the gear set is a planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;

further including a forward torque transmitting device connected to the carrier member, and the forward torque transmitting device includes an engaged position to transfer the engine torque in a forward mode;

further including a reverse torque transmitting device connected to the second sun gear member of the planetary gear set, and the reverse torque transmitting device includes an engaged position to transfer the engine torque in a reverse mode;

wherein the forward mode and the reverse mode are different; and wherein the forward and reverse torque transmitting devices are coupled to the turbine, and the forward and reverse torque transmitting devices each include an open position to disconnect the turbine from the output member.

12. The drive unit as set forth in claim 1:
wherein the gear set is a planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;

further including a forward torque transmitting device connected to the second electric machine, and the forward torque transmitting device includes an engaged position to transfer the engine torque in a forward mode;

further including a reverse torque transmitting device connected to the second sun gear member, and the reverse torque transmitting device includes an engaged position to transfer the engine torque in a reverse mode;

wherein the forward mode and the reverse mode are different; and wherein the forward and reverse torque transmitting devices are coupled to the turbine, and the forward and reverse torque transmitting devices each include an open position to disconnect the turbine from the output member.

13. The drive unit as set forth in claim 1 further including a torque transmitting device disposed between the input member and the output member and configured to connect the input member and the output member when the torque transmitting device is engaged which bypasses the hydrodynamic coupling apparatus.

14. The drive unit as set forth in claim 1:
wherein the gear set is a first planetary gear set;
further including a second planetary gear set coupled to the first planetary gear set;
wherein the first electric machine is connected to the second planetary gear set; and
wherein the output member is connected to the second planetary gear set.

15. The drive unit as set forth in claim 14:
wherein the first planetary gear set includes a sun gear member, a ring gear member and a carrier member that supports a plurality of pinion gears that mesh with both the ring gear member and the sun gear member;
wherein the second electric machine is connected to the sun gear member of the first planetary gear set;
wherein the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
wherein the carrier member of the first planetary gear set is connected to the carrier member of the second planetary gear set; and
wherein the sun gear member of the second planetary gear set is connected to the first electric machine.

16. The drive unit as set forth in claim 15 wherein:
the input member is connected to the ring gear member of the second planetary gear set; and
the output member is connected to the carrier member of the second planetary gear set.

17. The drive unit as set forth in claim 16 further including a first torque transmitting device connected to the turbine and the second electric machine, and the first torque transmitting device is disposed between the turbine and the second electric machine.

18. The drive unit as set forth in claim 16 further including a first torque transmitting device connected to the turbine and the carrier member of the first planetary gear set, and the first torque transmitting device is disposed between the turbine and the carrier member of the first planetary gear set.

19. The drive unit as set forth in claim 14:
wherein the first planetary gear set includes a sun gear member, a ring gear member and a carrier member that supports a plurality of pinion gears that mesh with both the ring gear member and the sun gear member;
wherein the second electric machine is connected to the sun gear member of the first planetary gear set;
wherein the second planetary gear set includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
wherein the first electric machine is connected to the first sun gear member of the second planetary gear set;
wherein the second sun gear member of the second planetary gear set is connected to the carrier member of the first planetary gear set;
further including a first torque transmitting device connected to the turbine and the ring gear member of the second planetary gear set, and the first torque transmitting device is disposed between the turbine and the second planetary gear set;
wherein the input member is connected to the carrier member of the second planetary gear set; and
wherein the output member is connected to the carrier member of the first planetary gear set and the second sun gear member of the second planetary gear set.

20. The drive unit as set forth in claim 14:
wherein the first planetary gear set includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
wherein the ring gear member of the first planetary gear set is grounded;
wherein the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
wherein the carrier member of the first planetary gear set is connected to the carrier member of the second planetary gear set;
wherein the first electric machine is connected to the sun gear member of the second planetary gear set;
wherein the second electric machine is connected to the first sun gear member of the first planetary gear set;
wherein the output member is connected to the carrier member of the second planetary gear set;
further including a forward torque transmitting device connected to the second electric machine, and the forward torque transmitting device includes an engaged position to transfer the engine torque in a forward mode;

further including a reverse torque transmitting device connected to the second sun gear member of the first planetary gear set, and the reverse torque transmitting device includes an engaged position to transfer the engine torque in a reverse mode;

wherein the forward mode and the reverse mode are different; and wherein the forward and reverse torque transmitting devices are coupled to the turbine, and the forward and reverse torque transmitting devices each include an open position to disconnect the turbine from the output member.

21. The drive unit as set forth in claim 20 wherein the passive one-way torque transmitting device is further disposed between the turbine and the forward torque transmitting device, and wherein the passive one-way torque transmitting device is further configured to disconnect the hydrodynamic coupling apparatus from the first and second planetary gear sets.

22. The drive unit as set forth in claim 14:
wherein the first planetary gear set includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;

wherein the ring gear member of the first planetary gear set is grounded;

wherein the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;

wherein the carrier member of the first planetary gear set is connected to the carrier member of the second planetary gear set;

wherein the first electric machine is connected to the sun gear member of the second planetary gear set;

wherein the second electric machine is connected to the first sun gear member of the first planetary gear set;

wherein the output member is connected to the carrier member of the second planetary gear set;

further including a forward torque transmitting device connected to the carrier member of the second planetary gear set, and the forward torque transmitting device includes an engaged position to transfer the engine torque in a forward mode;

further including a reverse torque transmitting device connected to the second sun gear member of the first planetary gear set, and the reverse torque transmitting device includes an engaged position to transfer the engine torque in a reverse mode;

wherein the forward mode and the reverse mode are different; and wherein the forward and reverse torque transmitting devices are coupled to the turbine, and the forward and reverse torque transmitting devices each include an open position to disconnect the turbine from the output member.

23. The drive unit as set forth in claim 22 wherein the passive one-way torque transmitting device is further disposed between the turbine and the reverse torque transmitting device, and wherein the passive one-way torque transmitting device is further configured to disconnect the hydrodynamic coupling apparatus from the first and second planetary gear sets.

24. The drive unit as set forth in claim 1:
wherein the gear set is a first planetary gear set that includes a sun gear member, a ring gear member and a carrier member that supports a plurality of pinion gears that mesh with both the ring gear member and the sun gear member;

wherein the second electric machine is connected to the sun gear member of the first planetary gear set;

further including a second planetary gear set that includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;

wherein the first electric machine is connected to the sun gear member of the second planetary gear set;

further including a third planetary gear set that includes a sun gear member, a ring gear member and a carrier member that supports a plurality of pinion gears that mesh with both the ring gear member and the sun gear member;

wherein the carrier member of the second planetary gear set is connected to the carrier member of the third planetary gear set;

wherein the carrier member of the first planetary gear set is connected to the sun gear member of the third planetary gear set;

further including a first torque transmitting device connected to the turbine;

wherein the input member is connected to the ring gear member of the second planetary gear set and the ring gear member of the third planetary gear set; and wherein the output member is connected to the carrier member of the second planetary gear set.

25. The drive unit as set forth in claim 24 wherein the first torque transmitting device is connected to the turbine and the carrier member of the third planetary gear set, and the first torque transmitting device is disposed between the turbine and the third planetary gear set.

26. The drive unit as set forth in claim 24 wherein the first torque transmitting device is connected to the turbine and the second electric machine, and the first torque transmitting device is disposed between the turbine and the second electric machine.

27. The drive unit as set forth in claim 1:
wherein the first electric machine is connected to the impeller;

wherein the gear set is a first planetary gear set that includes a sun gear member, a ring gear member, and a carrier member that supports a plurality of pinion gears that mesh with both the ring gear member and the sun gear member;

wherein the second electric machine is connected to the sun gear member of the first planetary gear set;

further including a second planetary gear set that includes a sun gear member, a ring gear member, a carrier member that supports a plurality of pinion gears that mesh with both the ring gear member and the sun gear member;

wherein the carrier member of the first planetary gear set is connected to the sun gear member of the second planetary gear set;
further including a first torque transmitting device connected to the turbine and the carrier member of the second planetary gear set, and the first torque transmitting device is disposed between the turbine and the second planetary gear set;
wherein the input member is connected to the ring gear member of the second planetary gear set; and
wherein the output member is connected to the carrier member of the second planetary gear set.

28. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
 the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
 the hydrodynamic coupling apparatus is configured to transfer the engine torque during a predetermined first condition;
 the first electric machine and/or the second electric machine produce the motor torque during the predetermined first condition;
 the first electric machine and/or the second electric machine produce the motor torque during a predetermined second condition without the hydrodynamic coupling apparatus operating;
 the second condition is different from the first condition;
 the turbine is indirectly connected to the gear set;
 the first electric machine is connected to the impeller;
 the gear set is a planetary gear set that includes a sun gear member, a ring gear member and a carrier member that supports a plurality of pinion gears that mesh with both the ring gear member and the sun gear member;
 the second electric machine is connected to the sun gear member of the planetary gear set;
 the output member is connected to the carrier member of the planetary gear set;
a first torque transmitting device connected to the turbine and the second electric machine, and the first torque transmitting device is disposed between the turbine and the second electric machine; and
wherein the second electric machine is disposed between the first torque transmitting device and the planetary gear set.

29. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
 the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
 the hydrodynamic coupling apparatus is configured to transfer the engine torque during a predetermined first condition;
 the first electric machine and/or the second electric machine produce the motor torque during the predetermined first condition;
 the first electric machine and/or the second electric machine produce the motor torque during a predetermined second condition without the hydrodynamic coupling apparatus operating;
 the second condition is different from the first condition;
 the turbine is indirectly connected to the gear set;
 the first electric machine is connected to the impeller;
 the gear set is a planetary gear set that includes a sun gear member, a ring gear member and a carrier member that supports a plurality of pinion gears that mesh with both the ring gear member and the sun gear member;
 the second electric machine is connected to the sun gear member of the planetary gear set;
 the output member is connected to the carrier member of the planetary gear set;
 the planetary gear set is further defined as a first planetary gear set;
a second planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
wherein the ring gear member of the second planetary gear set is connected to the carrier member of the first planetary gear set;
wherein the turbine is connected to the first sun gear member of the second planetary gear set;
a first torque transmitting device configured to connect the second sun gear member of the second planetary gear set to ground when the first torque transmitting device is engaged; and
a second torque transmitting device configured to connect the carrier member of the second planetary gear set to ground when the second torque transmitting device is engaged.

30. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
  the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
  the hydrodynamic coupling apparatus is configured to transfer the engine torque during a predetermined first condition;
  the first electric machine and/or the second electric machine produce the motor torque during the predetermined first condition;
  the first electric machine and/or the second electric machine produce the motor torque during a predetermined second condition without the hydrodynamic coupling apparatus operating;
    the second condition is different from the first condition;
    the turbine is indirectly connected to the gear set;
a first torque transmitting device coupled to the turbine and the gear set;
wherein the gear set is a planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member; and
wherein the output member is connected to the carrier member of the planetary gear set.

31. The drive unit as set forth in claim 30:
wherein the ring gear member is connected to the second electric machine;
wherein the turbine is coupled to the carrier member through the first torque transmitting device;
further including a second torque transmitting device connected to the carrier member and the first torque transmitting device;
further including a third torque transmitting device connected to the second sun gear member and the first torque transmitting device; and
wherein the first sun gear member is grounded.

32. The drive unit as set forth in claim 30:
wherein the first sun gear member is connected to the second electric machine;
further including a second torque transmitting device connected to the second electric machine and the first torque transmitting device;
further including a third torque transmitting device connected to the second sun gear member and the first torque transmitting device; and
wherein the ring gear member is grounded.

33. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
  the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
  the hydrodynamic coupling apparatus is configured to transfer the engine torque during a predetermined first condition;
  the first electric machine and/or the second electric machine produce the motor torque during the predetermined first condition;
  the first electric machine and/or the second electric machine produce the motor torque during a predetermined second condition without the hydrodynamic coupling apparatus operating;
  the second condition is different from the first condition;
  the turbine is indirectly connected to the gear set;
  the gear set is a planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
a forward torque transmitting device connected to the carrier member, and the forward torque transmitting device includes an engaged position to transfer the engine torque in a forward mode;
a reverse torque transmitting device connected to the second sun gear member of the planetary gear set, and the reverse torque transmitting device includes an engaged position to transfer the engine torque in a reverse mode;
wherein the forward mode and the reverse mode are different; and
wherein the forward and reverse torque transmitting devices are coupled to the turbine, and the forward and reverse torque transmitting devices each include an open position to disconnect the turbine from the output member.

34. An electro-mechanical drive unit comprising:
a first electric machine operable as a motor to produce motor torque or as a generator to produce energy;

a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
the hydrodynamic coupling apparatus is configured to transfer the engine torque during a predetermined first condition;
the first electric machine and/or the second electric machine produce the motor torque during the predetermined first condition;
the first electric machine and/or the second electric machine produce the motor torque during a predetermined second condition without the hydrodynamic coupling apparatus operating;
the second condition is different from the first condition;
the turbine is indirectly connected to the gear set;
the gear set is a planetary gear set that includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
a forward torque transmitting device connected to the second electric machine, and the forward torque transmitting device includes an engaged position to transfer the engine torque in a forward mode;
a reverse torque transmitting device connected to the second sun gear member, and the reverse torque transmitting device includes an engaged position to transfer the engine torque in a reverse mode;
wherein the forward mode and the reverse mode are different; and
wherein the forward and reverse torque transmitting devices are coupled to the turbine, and the forward and reverse torque transmitting devices each include an open position to disconnect the turbine from the output member.

35. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
the hydrodynamic coupling apparatus is configured to transfer the engine torque during a predetermined first condition;
the first electric machine and/or the second electric machine produce the motor torque during the predetermined first condition;
the first electric machine and/or the second electric machine produce the motor torque during a predetermined second condition without the hydrodynamic coupling apparatus operating;
the second condition is different from the first condition;
the turbine is indirectly connected to the gear set;
the gear set is a first planetary gear set;
a second planetary gear set coupled to the first planetary gear set;
wherein:
the first electric machine is connected to the second planetary gear set;
the output member is connected to the second planetary gear set;
the first planetary gear set includes a sun gear member, a ring gear member and a carrier member that supports a plurality of pinion gears that mesh with both the ring gear member and the sun gear member;
the second electric machine is connected to the sun gear member of the first planetary gear set;
the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
the carrier member of the first planetary gear set is connected to the carrier member of the second planetary gear set; and
the sun gear member of the second planetary gear set is connected to the first electric machine.

36. The drive unit as set forth in claim 35 wherein:
the input member is connected to the ring gear member of the second planetary gear set; and
the output member is connected to the carrier member of the second planetary gear set.

37. The drive unit as set forth in claim 36 further including a first torque transmitting device connected to the turbine and the second electric machine, and the first torque transmitting device is disposed between the turbine and the second electric machine.

38. The drive unit as set forth in claim 36 further including a first torque transmitting device connected to the turbine and the carrier member of the first planetary gear set, and the first torque transmitting device is disposed between the turbine and the carrier member of the first planetary gear set.

39. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
    the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
    the hydrodynamic coupling apparatus is configured to transfer the engine torque during a predetermined first condition;
    the first electric machine and/or the second electric machine produce the motor torque during the predetermined first condition;
    the first electric machine and/or the second electric machine produce the motor torque during a predetermined second condition without the hydrodynamic coupling apparatus operating;
    the second condition is different from the first condition;
    the turbine is indirectly connected to the gear set;
    the gear set is a first planetary gear set;
a second planetary gear set coupled to the first planetary gear set;
wherein:
    the first electric machine is connected to the second planetary gear set;
    the output member is connected to the second planetary gear set;
    the first planetary gear set includes a sun gear member, a ring gear member and a carrier member that supports a plurality of pinion gears that mesh with both the ring gear member and the sun gear member;
    the second electric machine is connected to the sun gear member of the first planetary gear set;
    the second planetary gear set includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
    the first electric machine is connected to the first sun gear member of the second planetary gear set;
    the second sun gear member of the second planetary gear set is connected to the carrier member of the first planetary gear set;
a first torque transmitting device connected to the turbine and the ring gear member of the second planetary gear set, and the first torque transmitting device is disposed between the turbine and the second planetary gear set;
wherein the input member is connected to the carrier member of the second planetary gear set; and
wherein the output member is connected to the carrier member of the first planetary gear set and the second sun gear member of the second planetary gear set.

40. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a gear set mechanically coupled to one of the first electric machine and the second electric machine;
an output member coupled to the gear set;
a hydrodynamic coupling apparatus including an impeller and a turbine fluidly connected to the impeller, and configured to transfer engine torque;
an input member connected to the impeller;
wherein:
    the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
    the hydrodynamic coupling apparatus is configured to transfer the engine torque during a predetermined first condition;
    the first electric machine and/or the second electric machine produce the motor torque during the predetermined first condition;
    the first electric machine and/or the second electric machine produce the motor torque during a predetermined second condition without the hydrodynamic coupling apparatus operating;
    the second condition is different from the first condition;
    the turbine is indirectly connected to the gear set;
    the first electric machine is connected to the impeller;
    the gear set is a first planetary gear set that includes a sun gear member, a ring gear member, and a carrier member that supports a plurality of pinion gears that mesh with both the ring gear member and the sun gear member;
    the second electric machine is connected to the sun gear member of the first planetary gear set;
a second planetary gear set that includes a sun gear member, a ring gear member, a carrier member that supports a plurality of pinion gears that mesh with both the ring gear member and the sun gear member;
wherein the carrier member of the first planetary gear set is connected to the sun gear member of the second planetary gear set;
a first torque transmitting device connected to the turbine and the carrier member of the second planetary gear set, and the first torque transmitting device is disposed between the turbine and the second planetary gear set;
wherein the input member is connected to the ring gear member of the second planetary gear set; and
wherein the output member is connected to the carrier member of the second planetary gear set.

41. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
 the gear set includes a first planetary gear set and a second planetary gear set;
 the turbine is coupled to the first planetary gear set along the first path;
 the input member is coupled to the second planetary gear set along the second path;
 the first planetary gear set includes a sun gear member, a ring gear member and a carrier member that supports a plurality of pinion gears that mesh with both the ring gear member and the sun gear member;
 the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
 the turbine is coupled to the carrier member of the first planetary gear set along the first path; and
 the input member is coupled to the ring gear member of the second planetary gear set along the second path.

42. The drive unit as set forth in claim 41 wherein the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor.

43. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
 the gear set includes a first planetary gear set and a second planetary gear set;
 the turbine is coupled to the first planetary gear set along the first path;
 the input member is coupled to the second planetary gear set along the second path;
 the first planetary gear set includes a sun gear member, a ring gear member and a carrier member that supports a plurality of pinion gears that mesh with both the ring gear member and the sun gear member;
 the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
 the turbine is coupled to the sun gear member of the first planetary gear set along the first path; and
 the input member is coupled to the ring gear member of the second planetary gear set along the second path.

44. The drive unit as set forth in claim 43 wherein the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor.

45. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
 the gear set includes a first planetary gear set and a second planetary gear set;
 the turbine is coupled to the first planetary gear set along the first path;
 the input member is coupled to the second planetary gear set along the second path;
 the first planetary gear set includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
 the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
the turbine is coupled to the second sun gear member of the first planetary gear set along the first path; and
the input member is coupled to the ring gear member of the second planetary gear set along the second path.

46. The drive unit as set forth in claim 45:
further including an output member coupled to the gear set;
wherein:
the input member is connected to the impeller;
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
the hydrodynamic coupling apparatus is configured to transfer the engine torque during a predetermined first condition;
the first electric machine and/or the second electric machine produce the motor torque during the predetermined first condition;
the first electric machine and/or the second electric machine produce the motor torque during a predetermined second condition without the hydrodynamic coupling apparatus operating;
the second condition is different from the first condition;
the turbine is indirectly connected to the gear set;
the second planetary gear set is coupled to the first planetary gear set;
the first electric machine is connected to the second planetary gear set;
the output member is connected to the second planetary gear set;
the ring gear member of the first planetary gear set is grounded;
the carrier member of the first planetary gear set is connected to the carrier member of the second planetary gear set;
the first electric machine is connected to the sun gear member of the second planetary gear set;
the second electric machine is connected to the first sun gear member of the first planetary gear set;
the output member is connected to the carrier member of the second planetary gear set;
further including a forward torque transmitting device connected to the second electric machine, and the forward torque transmitting device includes an engaged position to transfer the engine torque in a forward mode;
further including a reverse torque transmitting device connected to the second sun gear member of the first planetary gear set, and the reverse torque transmitting device includes an engaged position to transfer the engine torque in a reverse mode;
wherein the forward mode and the reverse mode are different; and
wherein the forward and reverse torque transmitting devices are coupled to the turbine, and the forward and reverse torque transmitting devices each include an open position to disconnect the turbine from the output member.

47. The drive unit as set forth in claim 46 further including a passive one-way torque transmitting device disposed between the turbine and the forward torque transmitting device, and wherein the passive one-way torque transmitting device is configured to disconnect the hydrodynamic coupling apparatus from the first and second planetary gear sets.

48. The drive unit as set forth in claim 45:
further including an output member coupled to the gear set;
wherein:
the input member is connected to the impeller;
wherein:
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
the hydrodynamic coupling apparatus is configured to transfer the engine torque during a predetermined first condition;
the first electric machine and/or the second electric machine produce the motor torque during the predetermined first condition;
the first electric machine and/or the second electric machine produce the motor torque during a predetermined second condition without the hydrodynamic coupling apparatus operating;
the second condition is different from the first condition;
the turbine is indirectly connected to the gear set;
the second planetary gear set is coupled to the first planetary gear set;
the first electric machine is connected to the second planetary gear set;
the output member is connected to the second planetary gear set;
the ring gear member of the first planetary gear set is grounded;
the carrier member of the first planetary gear set is connected to the carrier member of the second planetary gear set;
the first electric machine is connected to the sun gear member of the second planetary gear set;
the second electric machine is connected to the first sun gear member of the first planetary gear set;
the output member is connected to the carrier member of the second planetary gear set;
further including a forward torque transmitting device connected to the carrier member of the second planetary gear set, and the forward torque transmitting device includes an engaged position to transfer the engine torque in a forward mode;
further including a reverse torque transmitting device connected to the second sun gear member of the first planetary gear set, and the reverse torque transmitting device includes an engaged position to transfer the engine torque in a reverse mode;
wherein the forward mode and the reverse mode are different; and
wherein the forward and reverse torque transmitting devices are coupled to the turbine, and the forward and reverse torque transmitting devices each include an open position to disconnect the turbine from the output member.

49. The drive unit as set forth in claim 48 further including a passive one-way torque transmitting device disposed between the turbine and the reverse torque transmitting device, and wherein the passive one-way torque transmitting device is configured to disconnect the hydrodynamic coupling apparatus from the first and second planetary gear sets.

50. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
the gear set includes a first planetary gear set and a second planetary gear set;
the first planetary gear set includes a sun gear member, a ring gear member and a carrier member that supports a plurality of pinion gears that mesh with both the ring gear member and the sun gear member;
the second planetary gear set includes a first sun gear member, a second sun gear member, a ring gear member and a carrier member that supports a first group of pinion gears and a second group of pinion gears, and the first and second groups of pinion gears mesh with each other, and the first group of pinion gears mesh with the ring gear member and the first sun gear member, and the second group of pinion gears mesh with the second sun gear member;
the turbine is coupled to the ring gear member of the second planetary gear set along the first path; and
the input member is coupled to the first group of pinion gears of the second planetary gear set along the second path.

51. The drive unit as set forth in claim 50 wherein the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor.

52. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
the gear set includes a first planetary gear set, a second planetary gear set, and a third planetary gear set;
the first planetary gear set includes a sun gear member, a ring gear member and a carrier member that supports a plurality of pinion gears that mesh with both the ring gear member and the sun gear member;
the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
the third planetary gear set includes a sun gear member, a ring gear member and a carrier member that supports a plurality of pinion gears that mesh with both the ring gear member and the sun gear member;
the turbine is coupled to the carrier member of the third planetary gear set along the first path; and
the input member is coupled to the ring gear member of the second planetary gear set and the ring gear member of the third planetary gear set along the second path.

53. The drive unit as set forth in claim 52:
further including an output member coupled to the gear set;
further including a first torque transmitting device connected to the turbine;
wherein:
the input member is connected to the impeller;
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
the hydrodynamic coupling apparatus is configured to transfer the engine torque during a predetermined first condition;
the first electric machine and/or the second electric machine produce the motor torque during the predetermined first condition;
the first electric machine and/or the second electric machine produce the motor torque during a predetermined second condition without the hydrodynamic coupling apparatus operating;
the second condition is different from the first condition;
the turbine is indirectly connected to the gear set;
the second electric machine is connected to the sun gear member of the first planetary gear set;
the first electric machine is connected to the sun gear member of the second planetary gear set;
the carrier member of the second planetary gear set is connected to the carrier member of the third planetary gear set;
the carrier member of the first planetary gear set is connected to the sun gear member of the third planetary gear set;
the input member is connected to the ring gear member of the second planetary gear set and the ring gear member of the third planetary gear set; and
the output member is connected to the carrier member of the second planetary gear set.

54. The drive unit as set forth in claim 53 wherein the first torque transmitting device is connected to the turbine and the carrier member of the third planetary gear set, and the first torque transmitting device is disposed between the turbine and the third planetary gear set.

55. The drive unit as set forth in claim 53 wherein the first torque transmitting device is connected to the turbine and the second electric machine, and the first torque transmitting device is disposed between the turbine and the second electric machine.

56. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
the gear set includes a first planetary gear set, a second planetary gear set, and a third planetary gear set;
the first planetary gear set includes a sun gear member, a ring gear member and a carrier member that supports a plurality of pinion gears that mesh with both the ring gear member and the sun gear member;
the second planetary gear set includes a sun gear member, a ring gear member and a carrier member that supports a first group of pinion gears and a second group of pinion gears, and the first group of pinion gears and the second group of pinion gears mesh with each other, and the first group of pinion gears mesh with the ring gear member, and the second group of pinion gears mesh with the sun gear member;
the third planetary gear set includes a sun gear member, a ring gear member and a carrier member that supports a plurality of pinion gears that mesh with both the ring gear member and the sun gear member;
the turbine is coupled to the sun gear member of the first planetary gear set along the first path; and
the input member is coupled to the ring gear member of the second planetary gear set and the ring gear member of the third planetary gear set along the second path.

57. The drive unit as set forth in claim 56:
further including an output member coupled to the gear set;
further including a first torque transmitting device connected to the turbine;
wherein:
the input member is connected to the impeller;
the hydrodynamic coupling apparatus is coupled to the first and/or second electric machines to combine the engine torque transferred via the hydrodynamic coupling apparatus with the motor torque produced by the first and/or second electric machines when the first and/or second electric machines operate as the motor;
the hydrodynamic coupling apparatus is configured to transfer the engine torque during a predetermined first condition;
the first electric machine and/or the second electric machine produce the motor torque during the predetermined first condition;
the first electric machine and/or the second electric machine produce the motor torque during a predetermined second condition without the hydrodynamic coupling apparatus operating;
the second condition is different from the first condition;
the turbine is indirectly connected to the gear set;
the second electric machine is connected to the sun gear member of the first planetary gear set;
the first electric machine is connected to the sun gear member of the second planetary gear set;
the carrier member of the second planetary gear set is connected to the carrier member of the third planetary gear set;
the carrier member of the first planetary gear set is connected to the sun gear member of the third planetary gear set;
the input member is connected to the ring gear member of the second planetary gear set and the ring gear member of the third planetary gear set; and
the output member is connected to the carrier member of the second planetary gear set.

58. An electro-mechanical drive unit comprising:
a first electric machine operable as a motor to produce motor torque or as a generator to produce energy;
a second electric machine operable as a motor to produce motor torque or as a generator to produce energy;
wherein the first and second electric machines are in electrical communication with each other;
a hydrodynamic coupling apparatus including an impeller and a turbine fluidly connected to the impeller, and configured to transfer engine torque;
a gear set mechanically coupled to one of the first electric machine and the second electric machine;
wherein the turbine of the hydrodynamic coupling apparatus is coupled to the gear set along a first path;
an input member is coupled to the gear set along a second path that is different from the first path;
wherein:
the gear set includes a first planetary gear set and a second planetary gear set;
the turbine is coupled to the second planetary gear set along the first path; and
the input member is coupled to the second planetary gear set along the second path.

59. The drive unit as set forth in claim 58 wherein:
the first planetary gear set includes a sun gear member, a ring gear member, and a carrier member that supports a plurality of pinion gears that mesh with both the ring gear member and the sun gear member;
the second planetary gear set includes a sun gear member, a ring gear member, a carrier member that supports a plurality of pinion gears that mesh with both the ring gear member and the sun gear member;
the turbine is coupled to the carrier member of the second planetary gear set along the first path; and
the input member is coupled to the ring gear member of the second planetary gear set along the second path.

* * * * *